United States Patent
Xiu et al.

(10) Patent No.: US 12,309,368 B2
(45) Date of Patent: *May 20, 2025

(54) METHODS AND DEVICES FOR INTRA SUB-PARTITION CODING MODE

(71) Applicant: BEIJING DAJIA INTERNET INFORMATION TECHNOLOGY CO., LTD., Beijing (CN)

(72) Inventors: Xiaoyu Xiu, San Diego, CA (US); Yi-wen Chen, San Diego, CA (US); Xianglin Wang, San Diego, CA (US); Tsung-Chuan Ma, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,943

(22) Filed: Feb. 26, 2024

(65) Prior Publication Data

US 2024/0244203 A1 Jul. 18, 2024

Related U.S. Application Data

(63) Continuation of application No. 17/460,161, filed on Aug. 27, 2021, now Pat. No. 11,962,770, which is a (Continued)

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/12* (2014.11);
(Continued)

(58) Field of Classification Search
CPC .... H04N 19/105; H04N 19/11; H04N 19/119; H04N 19/12; H04N 19/132;
(Continued)

(56) References Cited

U.S. PATENT DOCUMENTS 11,962,770 B2 * 4/2024 Xiu .................. H04N 19/593
2016/0156934 A1 6/2016 Lee et al.
(Continued)

FOREIGN PATENT DOCUMENTS

| WO | 2016082774 A1 | 6/2016 |
| WO | 2019009584 A1 | 1/2019 |
| WO | 2020163478 A1 | 8/2020 |

OTHER PUBLICATIONS

Intenational Search Report of PCT Application No. PCT/US2020/017761 dated Jun. 11, 2020,(3p).
(Continued)

*Primary Examiner* — Kathleen M Walsh
(74) *Attorney, Agent, or Firm* — Arch Lake LLP; Hao Tan; Shen Wang

(57) ABSTRACT

The present disclosure relates to an intra sub-partition (ISP) method of encoding a video signal. The method includes partitioning a block of video data into a plurality of sub-partitions, obtaining a number of most probable intra predictions based on intra prediction modes of neighboring blocks of a current block and determining an intra prediction mode to predict the samples of the block sub-partitions, selecting an optimal transform combination from DCT-II, DST-VII and DCT-VIII transform kernels for each sub-partition, obtaining residual coefficients of a first sub-partition and deriving dequantized residual coefficients of the first sub-partition, deriving residual samples of the first sub-partition by performing inverse transform on dequantized residual coefficients of the first sub-partition in horizontal and vertical directions, deriving prediction samples of
(Continued)

the first sub-partition, and deriving the reconstructed samples of the first sub-partition, and deriving prediction samples of a second sub-partition.

9 Claims, 21 Drawing Sheets

Related U.S. Application Data continuation of application No. PCT/US2020/017761, filed on Feb. 11, 2020.

(60) Provisional application No. 62/804,207, filed on Feb. 11, 2019.

(51) Int. Cl.
| | | |
|---|---|---|
| *H04N 19/12* | (2014.01) | |
| *H04N 19/132* | (2014.01) | |
| *H04N 19/159* | (2014.01) | |
| *H04N 19/176* | (2014.01) | |
| *H04N 19/46* | (2014.01) | |
| *H04N 19/625* | (2014.01) | |

(52) U.S. Cl.
CPC ......... *H04N 19/132* (2014.11); *H04N 19/159* (2014.11); *H04N 19/176* (2014.11); *H04N 19/46* (2014.11); *H04N 19/625* (2014.11)

(58) Field of Classification Search
CPC .... H04N 19/159; H04N 19/176; H04N 19/46; H04N 19/593; H04N 19/61; H04N 19/625; H04N 19/70; H04N 19/96
USPC ..................................................... 375/240.02
See application file for complete search history.

(56) References Cited

U.S. PATENT DOCUMENTS

2018/0048889 A1    2/2018  Zhang et al.
2021/0266581 A1*   8/2021  Jung .................... H04N 19/70

OTHER PUBLICATIONS

Bantiago De-Luxan-Hemandez et al., "CE3:Intra Sub-Partitions Coding Mode(Tests 1.1.1 and 1.1.2)", Joint Video Experts Team(JVET)of TU-TSG 16 WP 3and ISO/IEC JTC 1/SC 29/WG 11,JVET-M0102-v5,13th Meeting, Marrakech, MA, Jan. 18, 2019,(9p).
Geert Van der Auwera et al,"Description of Core Experiment 3 (CE3): Intra Prediction and Mode Coding",Joint Video Experts Team(JVET)of ITU-TSG 16 WP 3and ISO/IEC JTC 1/SC 29/WG 11,JVET-M1023-v3, 13th Meeting, Marrakech, MA, Jan. 18, 2019,(25p).
Jianle Chen et al."Algorithm description for Versatile Video Coding and Test Mode 4(VTM4)", Joint Video Experts Team(JVET)of ITU-TSG 16 WP 3 and ISO/IEC JTC 1/SC 29WG 11,JVET-M1002-v2,13th Meeting: Marrakech, MA,Jan. 9-18, 2019,(62p).
Byledance Inc, Zhang (Bytedance)L et al:"CE6 related: On Index Signaling of Multiple Transform Selection", Joint Video Experts Team(JVET)of ITU-T SG 16 WP 3 and ISO/IEC JTC 1/SC 29/WG 11,JVET-L0331-v1, 12th Meeting: Macao,CN, Oct. 3-12, 2018,(4p).
The extended European search report issued in application No. 20756237.2, dated Oct. 24, 2022,(9p).

* cited by examiner

METHODS AND DEVICES FOR INTRA SUB-PARTITION CODING MODE

CROSS-REFERENCE TO RELATED APPLICATION

This application is a continuation application of U.S. application Ser. No. 17/460,161, filed on Aug. 27, 2021, which is a continuation application of PCT application No. PCT/US2020/017761 filed on Feb. 11, 2020, which claims priority to a Provisional Application No. 62/804,207 filed on Feb. 11, 2019, the entire contents thereof are incorporated herein by reference for all purposes.

TECHNICAL FIELD

This application is related to video coding and compression. More specifically, this disclosure relates to the improvements and simplifications of the intra sub-partition (ISP) coding mode for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods for improvements and simplifications of the intra sub-partition coding mode for video coding.

According to a first aspect of the present disclosure, an intra sub-partition (ISP) method of encoding a video signal is provided. The method may include partitioning a block of video data into a plurality of sub-partitions, where each sub-partition may include N×M samples where N and M are number of samples in horizontal or vertical direction, obtaining a number of most probable intra predictions based on intra prediction modes of neighboring blocks of a current block and determining an intra prediction mode to predict the samples of the block sub-partitions, selecting an optimal transform combination from DCT-II, DST-VII and DCT-VIII transform kernels for each sub-partition, where selecting the optimal transform combination includes applying a multiple transform selection (MTS) mode to the ISP, where the optimal transform combination may be indicated by one MTS flag and one MTS index, and obtaining residual coefficients of a first sub-partition and deriving dequantized residual coefficients of the first sub-partition by performing inverse-quantization of the residual coefficients of the first sub-partition. The method may also include deriving residual samples of the first sub-partition by performing inverse transforms on dequantized residual coefficients of the first sub-partition in horizontal and vertical directions, where the inverse transforms may be based on the optimal transform combination of the first sub-partition, deriving prediction samples of the first sub-partition by performing intra prediction of the first sub-partition based on neighboring reconstructed samples adjacent to the first sub-partition, deriving the reconstructed samples of the first sub-partition by adding the residual samples of the first sub-partition to the prediction samples of the first sub-partition; and deriving prediction samples of a second sub-partition by performing intra prediction of the second sub-partition based on the reconstructed samples of the first sub-partition.

According to a second aspect of the present disclosure, a computing device is provided that includes one or more processors, a non-transitory computer-readable memory storing instructions executable by the one or more processors. The one or more processors may be configured to partition a block of video data into a plurality of sub-partitions, where each sub-partition comprises N×M samples where N and M are number of samples in horizontal or vertical direction, obtain a number of most probable intra predictions based on intra prediction modes of neighboring blocks of a current block and determining an intra prediction mode to predict the samples of the block sub-partitions, select an optimal transform combination from DCT-II, DST-VII and DCT-VIII transform kernels for each sub-partition, where selecting the optimal transform combination includes applying a MTS mode to the ISP, where the optimal transform combination may be indicated by one MTS flag and one MTS index, and obtain residual coefficients of a first sub-partition and deriving dequantized residual coefficients of the first sub-partition by performing inverse-quantization of the residual coefficients of the first sub-partition.

The one or more processors may also be configured to derive residual samples of the first sub-partition by performing inverse transforms on dequantized residual coefficients of the first sub-partition in horizontal and vertical directions, where the inverse transforms may be based on the optimal transform combination of the first sub-partition, derive prediction samples of the first sub-partition by performing intra prediction of the first sub-partition based on neighboring reconstructed samples adjacent to the first sub-partition, derive the reconstructed samples of the first sub-partition by adding the residual samples of the first sub-partition to the prediction samples of the first sub-partition; and derive prediction samples of a second sub-partition by performing intra prediction of the second sub-partition based on the reconstructed samples of the first sub-partition.

According to a third aspect of the present disclosure, a non-transitory computer-readable storage medium having stored therein a plurality of programs for execution by a computing device having one or more processors is provided. When the plurality of programs are executed by the one or more processors of the device, cause the computing device to perform partitioning a block of video data into a plurality of sub-partitions, where each sub-partition comprises N×M samples where N and M are number of samples in horizontal or vertical direction, obtaining a number of most probable intra predictions based on intra prediction modes of neighboring blocks of a current block and determining an intra prediction mode to predict the samples of the block sub-partitions, selecting an optimal transform combination from DCT-II, DST-VII and DCT-VIII transform kernels for each sub-partition, where selecting the optimal transform combination includes applying a multiple transform selection (MTS) mode to the ISP, where the optimal transform combination may be indicated by one MTS flag and one MTS index, and obtaining residual coefficients of a first sub-partition and deriving dequantized residual coefficients of the first sub-partition by performing inverse-quantization of the residual coefficients of the first sub-partition.

The plurality of programs may further cause the one or more processors to perform deriving residual samples of the first sub-partition by performing inverse transforms on dequantized residual coefficients of the first sub-partition in horizontal and vertical directions, where the inverse transforms may be based on the optimal transform combination of the first sub-partition, deriving prediction samples of the first sub-partition by performing intra prediction of the first sub-partition based on neighboring reconstructed samples adjacent to the first sub-partition, deriving the reconstructed samples of the first sub-partition by adding the residual samples of the first sub-partition to the prediction samples of the first sub-partition; and deriving prediction samples of a second sub-partition by performing intra prediction of the second sub-partition based on the reconstructed samples of the first sub-partition.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
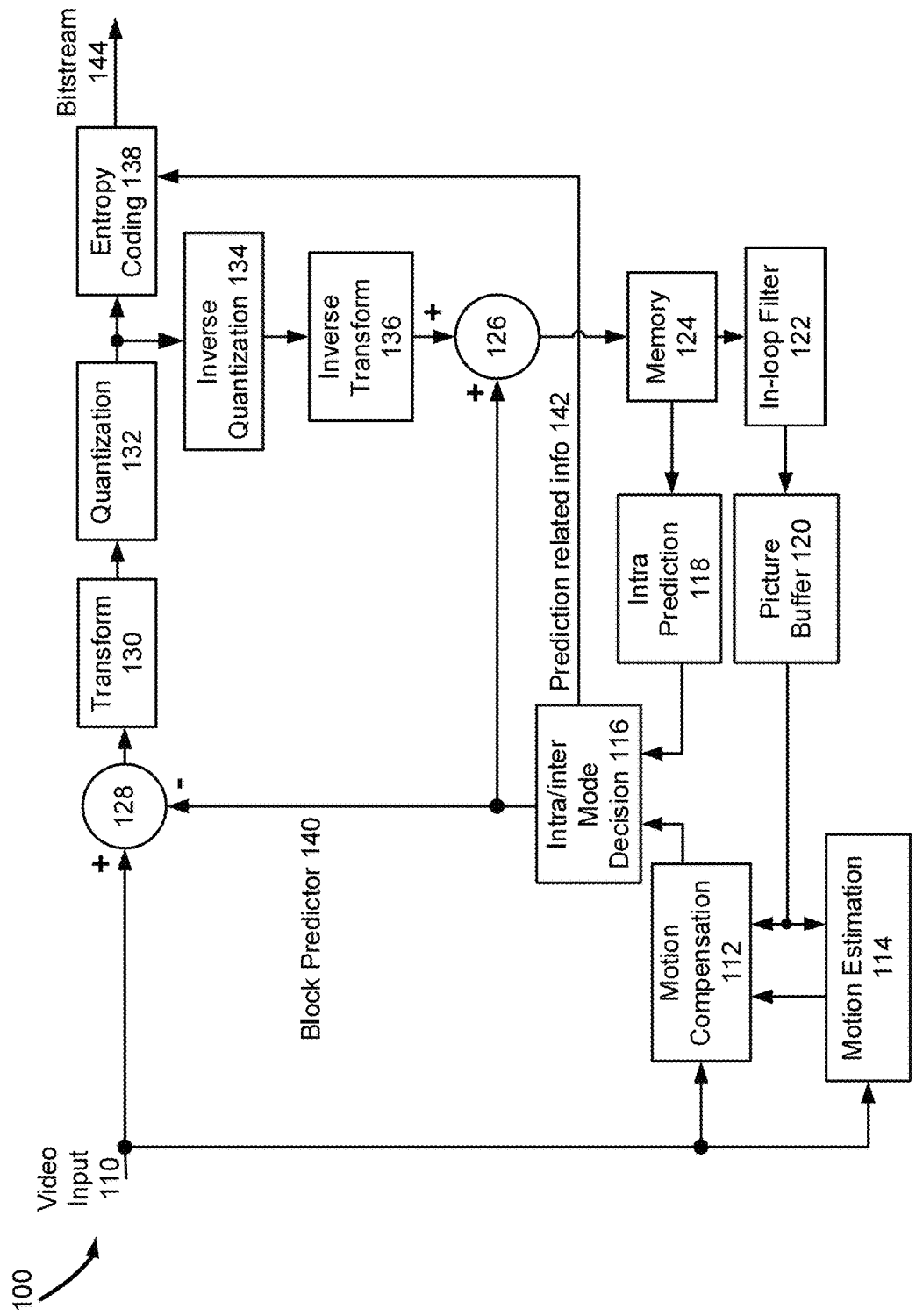
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin a significant study of advanced technologies that could enable substantial enhancement of coding efficiency. One reference software called the joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework. FIG. 1 (described below) gives the block diagram of a generic block-based hybrid video encoding system. The input video signal is processed block by block (called coding units (CUs)). In VTM-1.0, a CU can be up to 128×128 pixels. However, different from the HEVC, which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 5A, 5B, 5C, 5D, and 5E (described below), there are five splitting types, quaternary partitioning, horizontal binary partitioning, vertical binary partitioning, horizontal ternary partitioning, and vertical ternary partitioning. In FIG. 1 (described below, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. The temporal prediction signal for a given CU is usually signaled by one or more motion vectors (MVs), which indicate the amount and the direction of motion between the current CU and its temporal reference. Also, when multiple reference pictures are supported, one reference picture index is additionally sent, which is used to identify from which reference picture in the reference picture stored the temporal prediction signal comes from. After spatial and/or temporal prediction, the mode decision block in the encoder chooses the best prediction mode, for example, based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
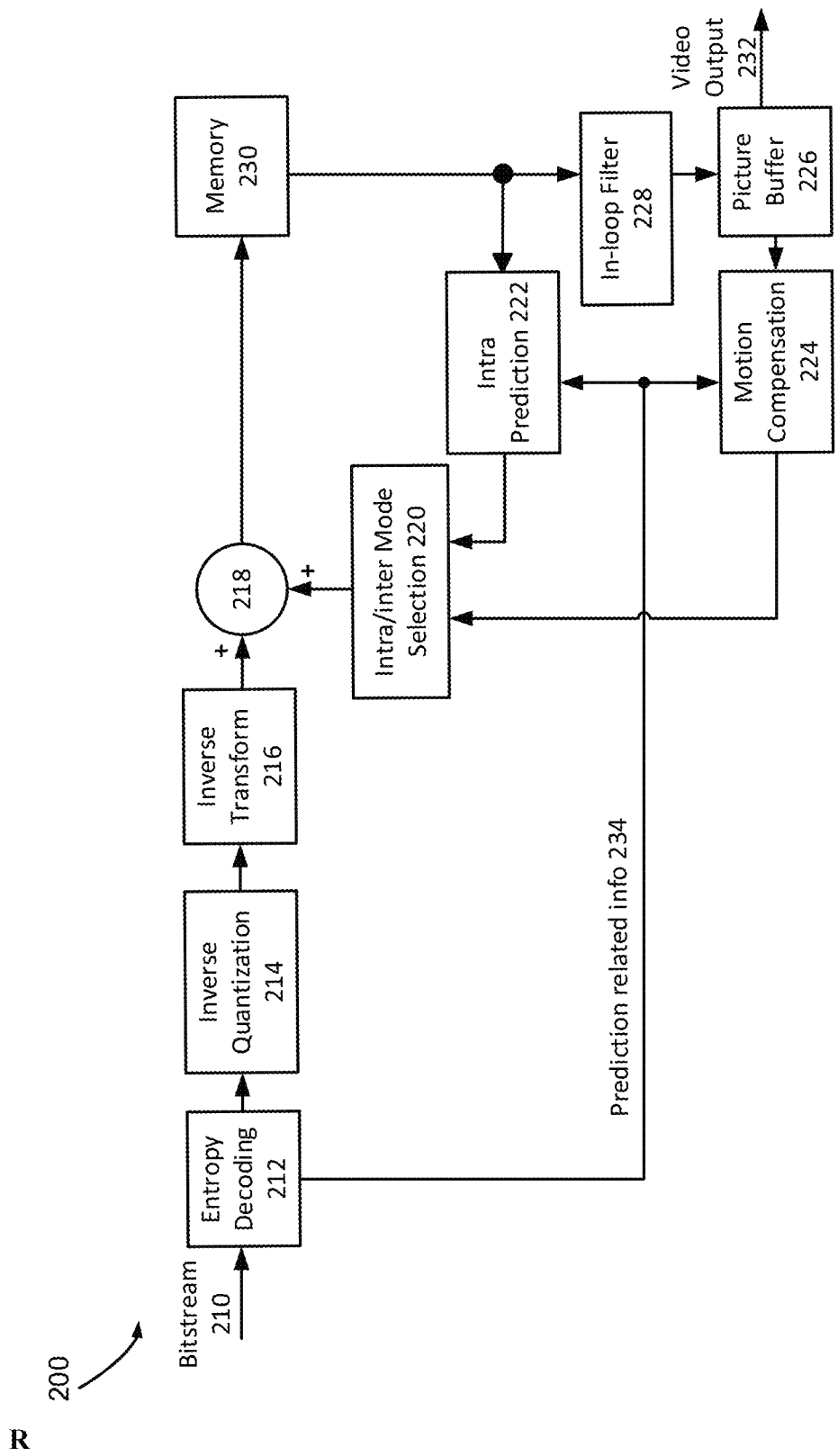
FIG. 2 is a block diagram of a decoder, according to an example of the present disclosure.

FIG. 2 (described below) gives a general block diagram of a block-based video decoder. The video bit-stream is first entropy decoded at entropy decoding unit. The coding mode and prediction information are sent to either the spatial prediction unit (when intra coded) or the temporal prediction unit (when inter coded) to form the prediction block. The residual transform coefficients are sent to the inverse quantization unit and inverse transform unit to reconstruct the residual block. The prediction block and the residual block are then added together. The reconstructed block may further go through in-loop filtering before it is stored in reference picture storage. The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., intra sub-partition (ISP) coding mode, extended intra prediction with wide-angle intra directions, position-dependent intra prediction combination (PDPC) and 4-tap intra interpolation. The main focus of the disclosure is to improve the existing ISP design in the VVC standard. However, in the following, other coding tools (e.g., the tools in the intra prediction and transform coding) that are included in the VVC and closely related to the proposed techniques in the disclosure are briefly reviewed.

FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Figure 3:
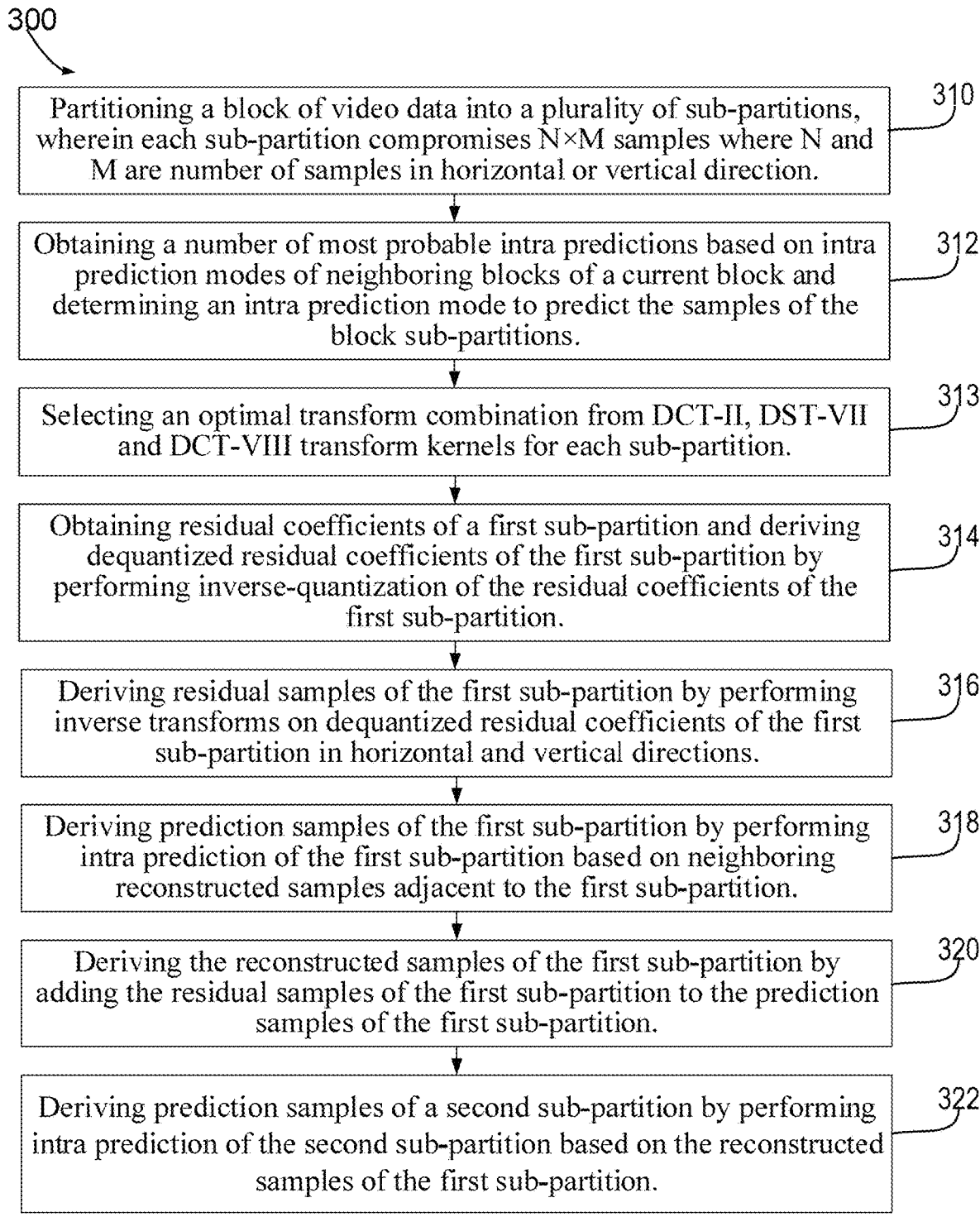
FIG. 3 is a flow chart illustrating an intra sub-partition (ISP)method for decoding a video signal, according to an example of the present disclosure.

FIG. 3 shows an example ISP method for decoding a video signal in accordance with the present disclosure.

In step 310, partitioning a block of video data into a plurality of sub-partitions, where each sub-partition may include N×M samples where N and M are number of samples in horizontal or vertical direction.

In step 312, obtaining a number of most probable intra predictions based on intra prediction modes of neighboring blocks of a current block and determining an intra prediction mode to predict the samples of the block sub-partitions.

In step 314, obtaining residual coefficients of a first sub-partition and deriving dequantized residual coefficients of the first sub-partition by performing inverse-quantization of the residual coefficients of the first sub-partition.

In step 316, selecting an optimal transform combination from transform kernels and deriving residual samples of the first sub-partition by performing inverse transform on dequantized residual coefficients of the first sub-partition in horizontal and vertical directions, wherein selecting the optimal transform combination comprises applying a multiple transform selection (MTS) mode to the ISP, wherein the MTS introduces core transforms to the sub-partitions that are partitioned from the block, and the optional transform combination is selected based on the MTS.

In step 318, deriving prediction samples of the first sub-partition by performing intra prediction of the first sub-partition based on neighboring reconstructed samples adjacent to the first sub-partition.

In step 320, deriving the reconstructed samples of the first sub-partition by adding the residual samples of the first sub-partition to the prediction samples of the first sub-partition.

In step 322, deriving prediction samples of a second sub-partition by performing intra prediction of the second sub-partition based on the reconstructed samples of the first sub-partition.

Figure 4:
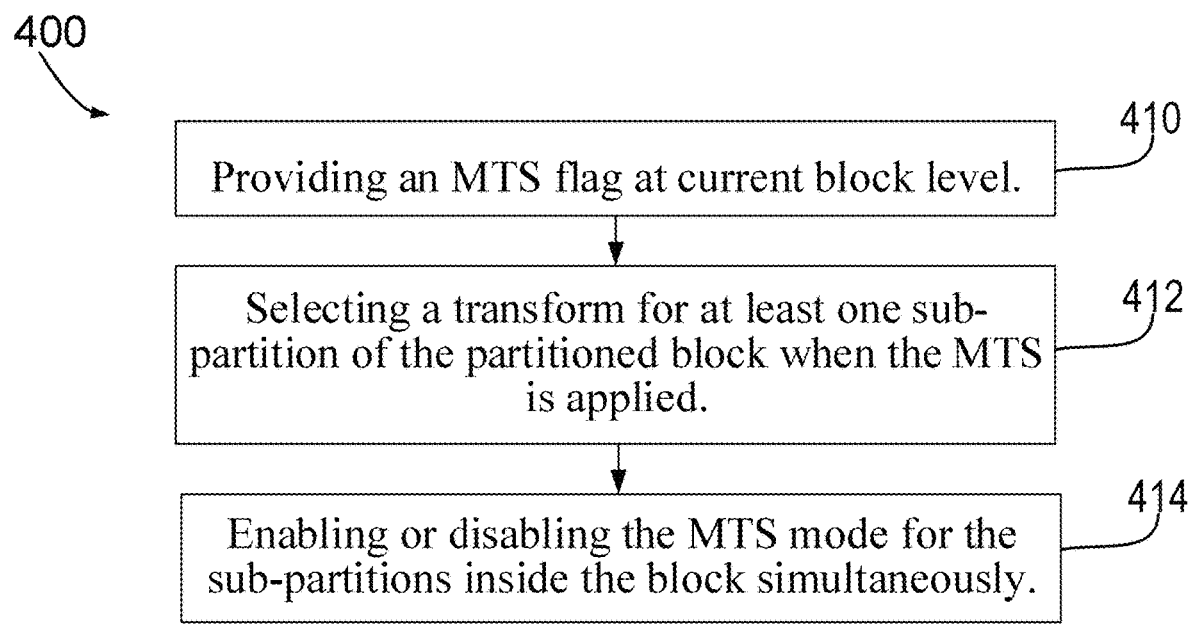
FIG. 4 is a flow chart illustrating a method for applying multiple transform selection (MTS) mode to the ISP, according to an example of the present disclosure.

FIG. 4 shows an example method for applying MTS mode to the ISP in accordance with the present disclosure.

In step 410, providing an MTS flag at current block level.

In step 412, selecting a transform for at least one sub-partition of the partitioned block when the MTS is applied.

In step 414, enabling or disabling the MTS mode for the sub-partitions inside the block simultaneously.

Figures 5A, 5B, 5C:
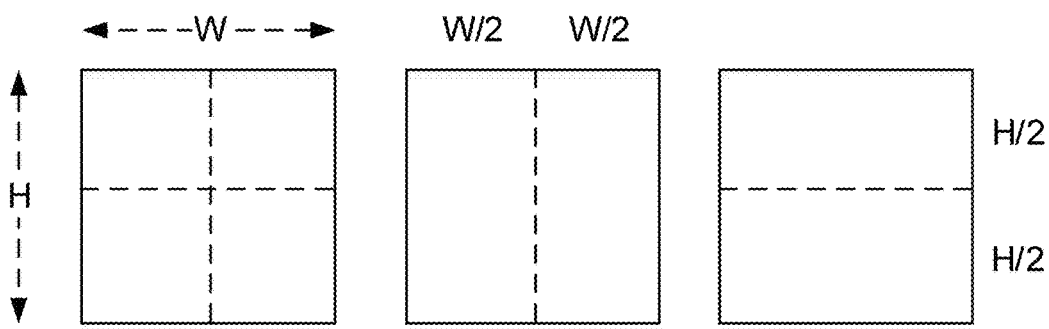
FIG. 5A is a diagram illustrating block partitions in a multi-type tree structure, according to an example of the present disclosure.
FIG. 5B is a diagram illustrating block partitions in a multi-type tree structure, according to an example of the present disclosure.
FIG. 5C is a diagram illustrating block partitions in a multi-type tree structure, according to an example of the present disclosure.

FIG. 5A shows a diagram illustrating block quaternary partition in a multi-type tree structure, in accordance with the present disclosure.

FIG. 5B shows a diagram illustrating block vertical binary partition in a multi-type tree structure, in accordance with the present disclosure.

FIG. 5C shows a diagram illustrating block horizontal binary partition in a multi-type tree structure, in accordance with the present disclosure.

Figure 5D:
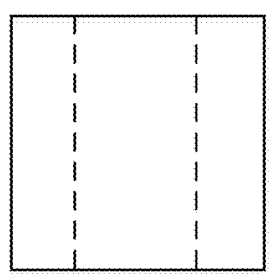
FIG. 5D is a diagram illustrating block partitions in a multi-type tree structure, according to an example of the present disclosure.

FIG. 5D shows a diagram illustrating block vertical ternary partition in a multi-type tree structure, in accordance with the present disclosure.

Figure 5E:
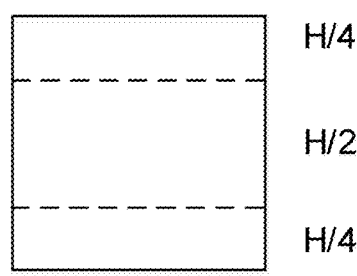
FIG. 5E is a diagram illustrating block partitions in a multi-type tree structure, according to an example of the present disclosure.

FIG. 5E shows a diagram illustrating block horizontal ternary partition in a multi-type tree structure, in accordance with the present disclosure.

Intra Prediction Modes with Wide-Angle Intra Directions

Figure 6:
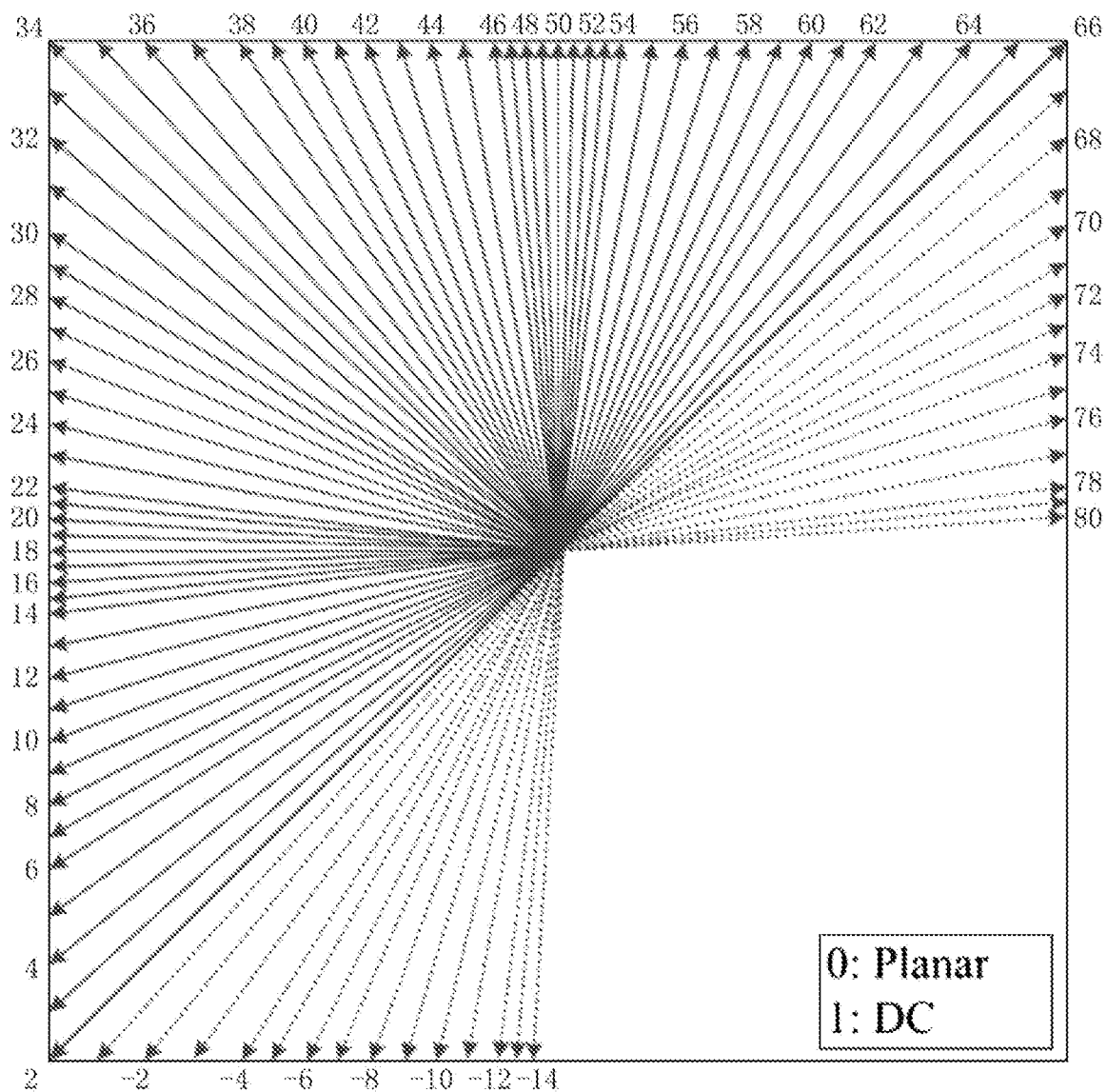
FIG. 6 is a diagram illustration of intra modes in the versatile video coding (VVC), according to an example of the present disclosure.

Like the HEVC, the VVC uses a set of previously decoded samples neighboring to one current CU (i.e., above or left) to predict the samples of the CU. However, to capture finer edge directions present in natural video (especially for video content in high resolutions, e.g., 4K), the amount of angular intra modes is extended from 33 in the HEVC to 93 in the VVC. In addition to angular directions, the same planar mode (which assumes a gradual changing surface with horizontal and vertical slope derived from boundaries) and DC mode (which assumes a flat surface) of the HEVC are also applied in the VVC standard. FIG. 6 (described below) illustrates the existing intra modes as defined in the VVC standard. Similar to the intra prediction in the HEVC, all the intra modes (i.e., planar, DC and angular directions) in the VVC utilize a set of neighboring reconstructed samples above and left to the predicted block as the reference for intra prediction. However, different from the HEVC where only the nearest row/column (i.e., line 0 in FIG. 7, described below) of reconstructed samples as reference, multi reference line (MRL) is introduced in the VVC where two additional rows/columns (i.e., line 1 and line 3 in FIG. 7, described below) are used for the intra prediction. The index of the selected reference row/column is signaled from encoder to decoder. When non-nearest row/column is selected, planar and DC modes are excluded from the set of intra modes that can be used to predict the current block. Assuming the nearest neighbors, FIGS. 8A, 8B, and 8C (described below) illustrates the location of the reference samples that are used in the VVC to derive the predicted samples of one intra block. As shown in FIGS. 8A, 8B, and 8C, because the quad/binary/ternary tree partition structure is applied, besides the coding blocks in square shape, rectangular coding blocks also exist for the intra prediction of the VVC. Due to the unequal width and height of one given block, various sets of angular directions are selected for different block shapes, which is also called wide-angle intra prediction. Specifically, for both square and rectangular coding blocks, besides planar and DC modes, 65 out of 93 angular directions are also supported for each block shape, as shown in Table 1. Such design can not only efficiently capture the directional structures that are typically present in video (by adaptively selecting angular directions based on block shapes) but also ensure that a total of 67 intra modes (i.e., planar, DC and 65 angular directions) are enabled for each coding block. This can achieve a good efficiency of signaling intra modes while providing a consistent design across different block sizes.

TABLE 1

The selected angular directions for the intra prediction of different block shapes in the VVC

| Block shape | Aspect ratio | Selected angular directions |
|---|---|---|
| Square, W =H | W/H == 1 | 2~66 |
| Flat rectangle, W > H | W/H == 2 | 8~72 |
| | W/H == 4 | 12~76 |
| | W/H == 8 | 14~78 |
| | W/H == 16 | 16~80 |
| | W/H == 32 | 17~81 |
| Tall rectangle, W < H | W/H == 1/2 | −4~60 |
| | W/H == 1/4 | −8~56 |
| | W/H == 1/8 | −10~54 |
| | W/H == 1/16 | −12~52 |
| | W/H == 1/32 | −13~51 |

FIG. 6 shows an illustration of the intra modes in the VVC, in accordance with the present disclosure.

Figure 7:
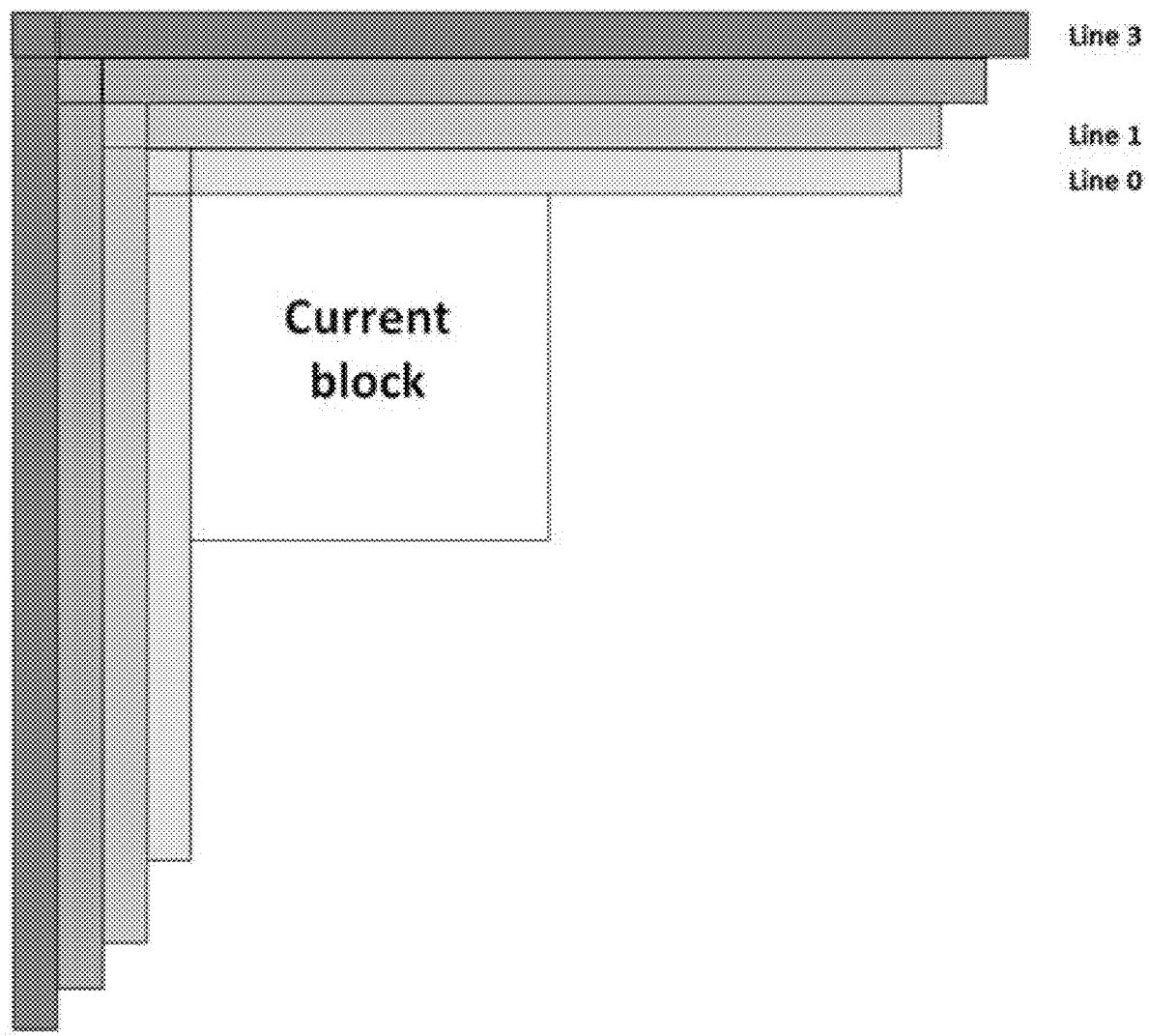
FIG. 7 is a diagram illustrating multiple reference line for the intra prediction in the VVC, according to an example of the present disclosure.
Figure 8A:
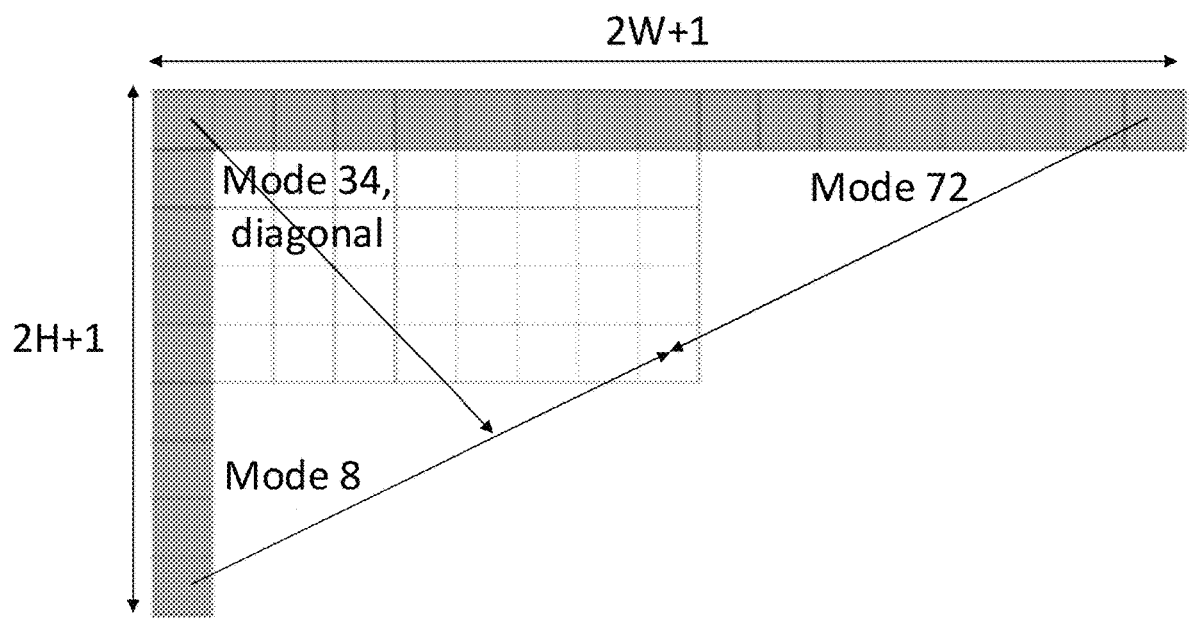
FIG. 8A is a diagram illustrating reference samples and angular directions that are used for the intra prediction, according to an example of the present disclosure.
Figure 8B:
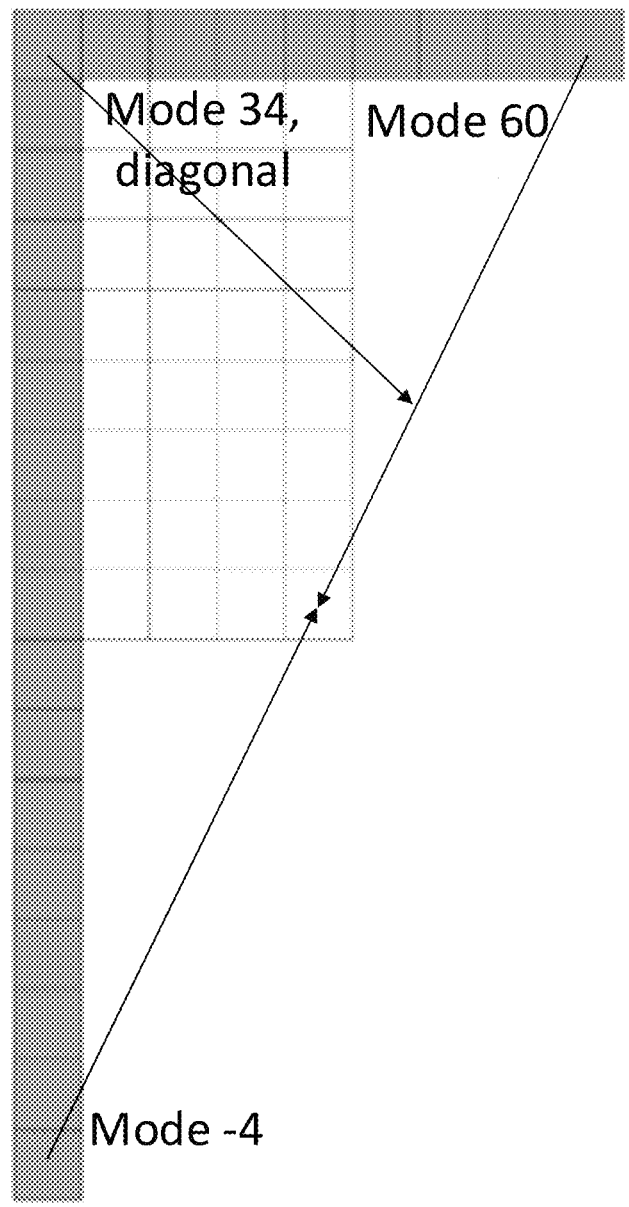
FIG. 8B is a diagram illustrating reference samples and angular directions that are used for the intra prediction, according to an example of the present disclosure.
Figure 8C:
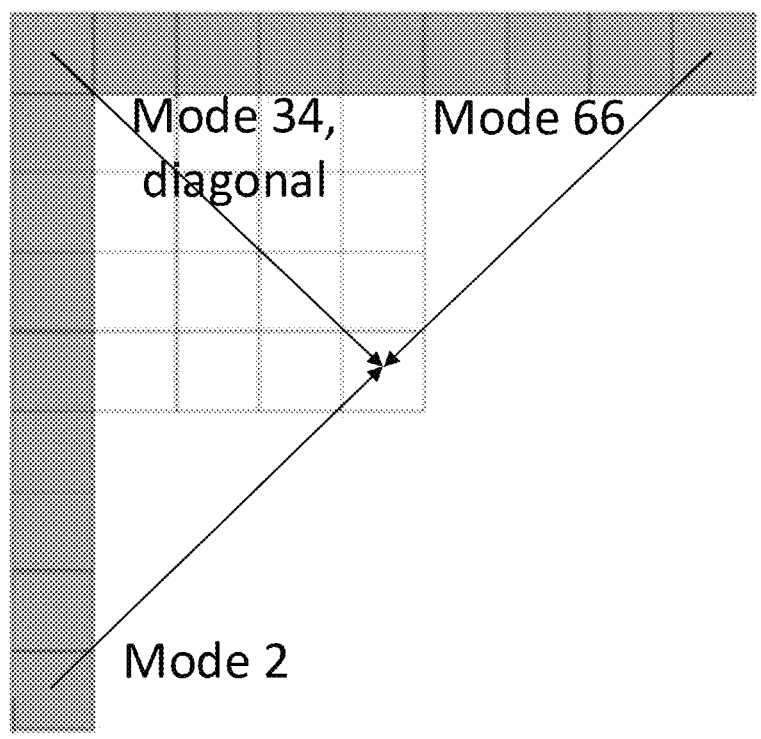
FIG. 8C is a diagram illustrating reference samples and angular directions that are used for the intra prediction, according to an example of the present disclosure.

FIG. 7 shows multiple reference line for the intra prediction in the VVC, in accordance to the present disclosure.

FIG. 8A shows an illustration of the reference samples and the angular directions that are used for the intra prediction of flat rectangular block (W/H=2), in accordance with the present disclosure.

FIG. 8B shows an illustration of the reference samples and the angular directions that are used for the intra prediction of tall rectangular block (W/H=1/2), in accordance with the present disclosure.

FIG. 8C shows an illustration of the reference samples and the angular directions that are used for the intra prediction of square block (W=H), in accordance with the present disclosure.

Position-Dependent Intra Prediction Combination

As mentioned earlier, the intra prediction samples are generated from either a non-filtered or a filtered set of neighboring reference samples, which may introduce discontinuities along the block boundaries between the current coding block and its neighbors. To resolve such problem, boundary filtering is applied in the HEVC by combing the first row/column of prediction samples of DC, horizontal (i.e., mode 18) and vertical (i.e., mode 50) prediction modes with the unfiltered reference samples utilizing a 2-tap filter (for DC mode) or a gradient-based smoothing filter (for horizontal and vertical prediction modes).

The position-dependent intra prediction combination (PDPC) tool in the VVC extends the above idea by employing a weighted combination of intra prediction samples with unfiltered reference samples. In the current VVC working draft, the PDPC is enabled for the following intra modes without signaling: planar, DC, horizontal (i.e., mode 18), vertical (i.e., mode 50), angular directions close to the bottom-left diagonal directions (i.e., mode 2, 3, 4, . . . , 10) and angular directions close to the top-right diagonal directions (i.e., mode 58, 59, 60, . . . , 66). Assuming the prediction sample located as coordinate (x, y) is pred(x,y), its corresponding value after the PDPC is calculated as $$pred(x, y) = (wL \times R_{-1,y} + wT \times R_{x,-1} -$$
$$wTL \times R_{-1,-1} + (64 - wL - wT + wTL) \times pred(x, y) + 32) \gg 6$$

where $R_{x,-1}$, $R_{-1,y}$ represent the reference samples located at the top and left of the current sample (x, y), respectively, and $R_{-1,-1}$ represents the reference sample located at the top-left corner of the current block. FIGS. 8A, 8B, and 8C illustrate the locations of the reference samples that are used to combine with the current prediction sample during the PDPC process. The weights wL, wT and wTL in equation (1) are adaptively selected depending on prediction mode and sample position, as described as follows where the current coding block is assumed to be in the size of W×H:

For the DC mode, $$wT = 32 \gg ((y \ll 1) \gg \text{shift}),$$
$$wL = 32 \gg ((x \ll 1) \gg \text{shift}), wTL = (wL \gg 4) + (wT \gg 4)$$

For the planar mode, $$wT = 32 \gg ((y \ll 1) \gg \text{shift}), wL = 32 \gg ((x \ll 1) \gg \text{shift}), wTL = 0$$

For horizontal mode:

$$wT = 32 \gg ((y \ll 1) \gg \text{shift}), wL = 32 \gg ((x \ll 1) \gg \text{shift}), wTL = wT$$

For vertical mode:

$$wT = 32 \gg ((y \ll 1) \gg \text{shift}), wL = 32 \gg ((x \ll 1) \gg \text{shift}), wTL = wL$$

For bottom-left diagonal directions:

$$wT = 16 \gg ((y \ll 1) \gg \text{shift}), wL = 16 \gg ((x \ll 1) \gg \text{shift}), wTL = 0$$

For top-right diagonal directions:

$$wT = 16 \gg ((y \gg 1) \gg \text{shift}), wL = 16 \gg ((x \ll 1) \gg \text{shift}), wTL = 0$$
$$\text{where shift} = (\log_2(W) - 2 + \log_2(H) - 2 + 2) \gg 2.$$

Multiple Transform Selection and Shape Adaptive Transform Selection

In addition to discrete cosine transform II (DCT-II) transform that is used in the HEVC, multiple transform selection (MTS) tool is enabled in the VVC by introducing additional core transforms of discrete cosine transform VIII (DCT-VIII), discrete sine transform IV (DST-IV) and discrete sine transform VII (DST-VII). In the VVC, the adaptive selection of the transforms is enabled at coding block level by signaling one MTS flag to bitstream. Specifically, when the MTS flag is equal to 0 for one block, one pair of fixed transforms (e.g., DCT-II) are applied in the horizontal and vertical directions. Otherwise (when the MTS flag is equal to 1), two additional flags will be further signaled for the block to indicate the transform type (either DCT-VIII or DST-VII) for each direction.

On the other hand, due to the introduction of quad/binary/ternary-tree based block partitioning structure in the VVC, the distribution of the residuals of intra prediction is highly correlated with the block shape. Therefore, when the MTS is disabled (i.e., the MTS flag is equal to 0 for one coding block), one shape adaptive transform selection method is applied to all intra-coded blocks in which the DCT-II and DST-VII transforms are implicitly enabled based on the width and height of the current block. More specifically, for each rectangle block, the method uses the DST-VII transform in the direction associated with shorter side of one block and DCT-II transform in the direction associated with longer side of the block. For each square block, the DST-VII is applied in both directions. Additionally, to avoid introducing new transforms in different block sizes, the DST-VII transform is only enabled when the shorter side of one intra-coded block is equal to or smaller than 16. Otherwise, the DCT-II transform is always applied. Table 2 illustrates the enabled horizontal and vertical transforms for intra-coded blocks based on the shape adaptive transform selection method in the VVC.

TABLE 2

Shape adaptive transform selection for intra blocks in the VVC

| Block size | | Horizontal trans. | Vertical trans. |
|---|---|---|---|
| min(W, H) > 16 | | DCT-II | DCT-II |
| min(W, H) ≤ 16 | W = H | DST-VII | DST-VII |
| | W > H | DCT-II | DST-VII |
| | W < H | DST-VII | DCT-II |

Intra Sub-Partition Coding Mode

Conventional intra mode only utilizes the reconstructed samples neighboring to one coding block to generate the intra prediction samples of the block. Based on such method, the spatial correlation between the predicted samples and the reference samples is roughly proportional to the distance between the predicted samples and the reference samples. Therefore, the samples at the inner part (especially the samples located at the bottom-right corner of the block) usually have a worse prediction quality than the samples that are close to the block boundaries. To further improve the intra prediction efficiency, short-distance intra prediction (SDIP) was proposed a long time ago and studied well during the development period of the HEVC standard. The method divides one intra coding block horizontally or vertically into multiple sub-blocks for prediction. Usually, a square block is divided into four sub-blocks. For example, an 8×8 block may be divided into four 2×8 or four 8×2 sub-blocks. One extreme case of such sub-block based intra prediction is so-called line-based prediction, wherein a block is divided into 1-D line/column for prediction. For example, one W×H (width×height) block can be split either into H sub-blocks in size of W×1 or into W sub-blocks in size of 1×H for intra prediction. Each of the resulting lines/columns are coded in the same way of normal 2-dimention (2-D) block (as shown in FIG. 1), i.e., it is predicted by one of the available intra modes and the prediction error is decorrelated based on transform and quantization and sent to decoder for reconstruction. Consequently, the reconstructed samples in one sub-block (e.g. a line/column) can be used as references to predict the samples in the next sub-block. The above process is repeated until all the sub-blocks within the current block are predicted and coded. Additionally, to reduce the signaling overhead, all the sub-blocks within one coding block shares the same intra mode.

With SDIP, different sub-block partitions may provide different coding efficiency. In general, line-based prediction offers the best coding efficiency because it provides "the shortest prediction distance" among different partitions. On the other hand, it also has the worst encoding/decoding throughput issue for codec hardware implementations. For example, considering a block with 4×4 sub-blocks versus the same block with 4×1 or 1×4 sub-blocks, the latter case is only one fourth of the throughput of the former case. In HEVC, the smallest intra prediction block size for luma is 4×4.

Figure 10A:
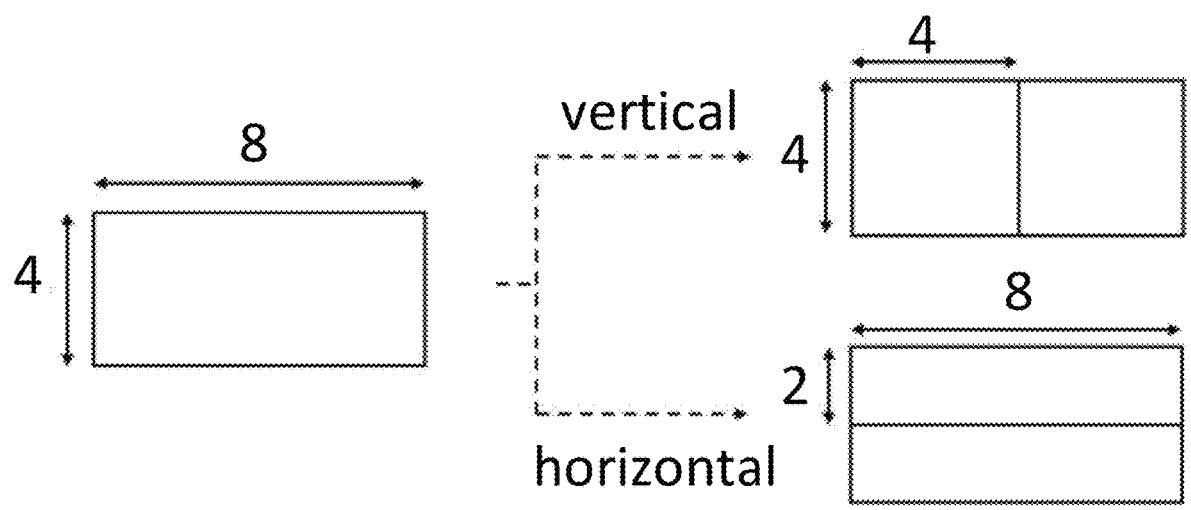
FIG. 10A is a diagram illustrating the SDIP partitions of blocks, according to an example of the present disclosure.
Figure 10B:
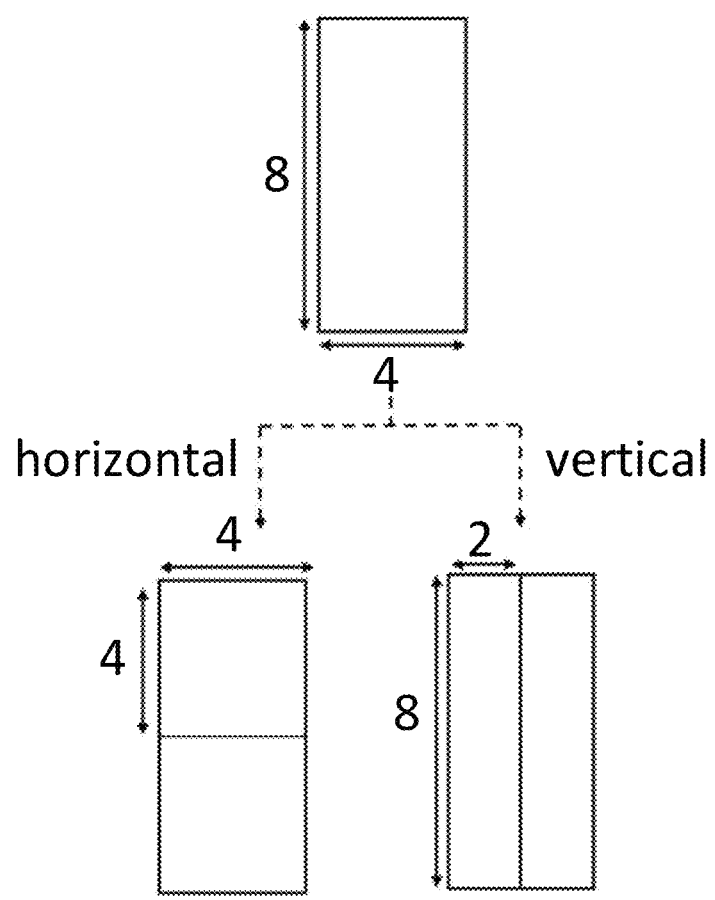
FIG. 10B is a diagram illustrating the SDIP partitions of blocks, according to an example of the present disclosure.
Figure 10C:
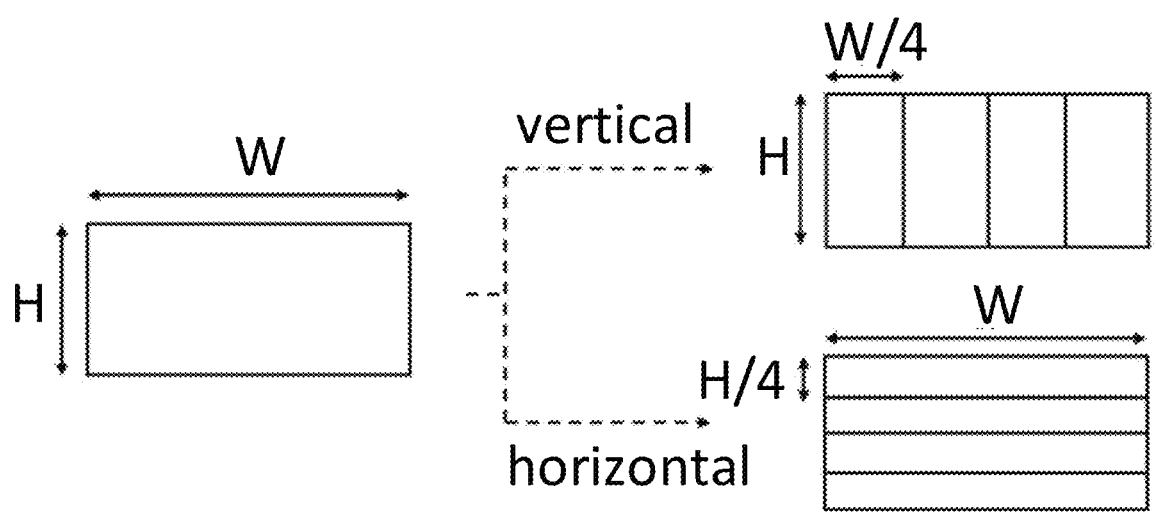
FIG. 10C is a diagram illustrating the SDIP partitions of blocks, according to an example of the present disclosure.

Recently, a video coding tool called sub-partition prediction (ISP) was introduced into VVC. Conceptually, ISP is very similar to SDIP. Specifically, depending on the block size, the ISP divides the current coding block into 2 or 4 sub-blocks in either horizontal or vertical direction and each sub-block contains at least 16 samples. FIG. 10A, 10B, 10C (described below) illustrates all the possible partition cases for different coding block sizes. Moreover, the following main aspects are also included in the current ISP design to handle its interaction with the other coding tools in the VVC:

Interaction with wide-angle intra direction: the ISP is combined with the wide-angle intra direction. In the current design, the block size (i.e., the width/height ratio) of the original coding block is used to determine whether a normal intra direction or its corresponding wide-angle intra direction should be applied. In other words, the block size of the block before sub-block partitions is used here.

Interaction with multiple reference line: the ISP cannot be jointly enabled with the multiple reference line. Specifically, in the current VVC signaling design, the ISP enabling/disabling flag is signaled after the MRL index. When one intra block has one non-zero MRL index (i.e., referring to non-nearest neighboring samples), the ISP enabling/disabling flag is not signaled but inferred as 0, i.e. ISP is automatically disabled for the coding block in this case.

Interaction with most probable mode: similar to a normal intra mode, the intra mode that is used for one ISP block is signaled through the most probable mode (MPM) mechanism. However, compared to the normal intra mode, the following modifications are made to the MPM method for ISP: 1) each ISP block only enables the intra modes that are included in the MPM list and disables all the other intra modes that are not in the MPM list; 2) for each ISP block, its MPM list excludes the DC mode and prioritizes the horizontal intra modes for ISP horizontal partition and vertical modes for ISP vertical partition respectively.

Interaction with multiple transform selection: the ISP is exclusively applied with the MTS, i.e., when one coding block uses ISP, its MTS flag is not signaled but always inferred as 0, i.e., disabled. However, instead of always using the DCT-II transform, a fixed set of core transforms (including DST-VII and DCT-II) are implicitly applied to ISP coded blocks based on the block sizes. Specifically, assuming W and H are the width and height of one ISP sub-partition, its horizontal and vertical transforms are selected according to the following rules as described in Table 3.

TABLE 3

The selected horizontal and vertical transforms for ISP blocks

| Sub-block size | Intra mode | Horizontal trans. | Vertical trans. |
|---|---|---|---|
| W = 2 or W > 32 | All available intra modes | DCT-II | DCT-II |
| H = 2 or H > 32 | All available intra modes | DCT-II | DCT-II |
| The other sub-block sizes | Planar, 31, 32, 34, 36, 37 | DCT-II | DCT-II |
| | DC, 33, 35 | DST-VII | DCT-II |
| | 2, 4, 6 . . . 28, 30, 39, 41, 43 . . . 63, 65 | DST-VII | DCT-II |

Figure 9:
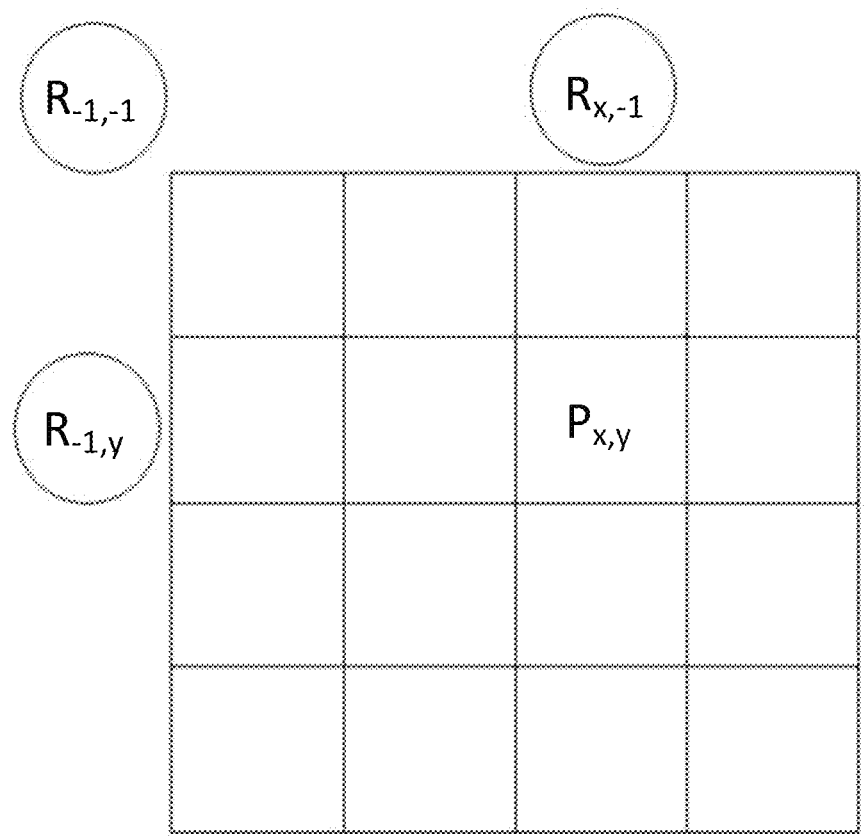
FIG. 9 is a diagram illustrating locations of the neighboring reconstructed samples that are used for the PDPC of one coding block, according to an example of the present disclosure.

FIG. 9 shows locations of the neighboring reconstructed samples that are used for the PDPC of one coding block, in accordance with the present disclosure.

FIG. 10A shows an illustration of the SDIP partitions of 8×4 blocks, in accordance with the present disclosure.

FIG. 10B shows an illustration of the SDIP partitions of 4×8 blocks, in accordance with the present disclosure.

FIG. 10C shows an illustration of the SDIP partitions of the other blocks, in accordance with the present disclosure.

Improvements to ISP

Although the ISP tool in VVC can enhance the intra prediction efficiency, there are still spaces to further improve its performance. Meanwhile, some parts of the existing ISP also need to be simplified for efficient codec hardware implementations. Specifically, the following issues in the existing ISP design have been identified in this disclosure.

First, for practical codec design, to minimize the implementation cost of the ISP, it is more reasonable to maximally reuse the existing intra prediction modules (e.g., reference sample access, intra sample prediction and so forth) of normal intra blocks for the ISP blocks. However, as discussed in the "intra sub-partition coding mode" section, when the ISP is combined with the wide-angle intra prediction, the decision on whether the original intra mode (i.e., the intra mode signaled at coding block level) should be replaced with its corresponding wide-angle intra mode for each sub-block is made based on the size/shape of the original coding block instead of the actual block (e.g. a sub-block) being predicted. This is inconsistent with the non-ISP intra coding blocks, which select between normal intra directions and wide-angle intra directions based on its own block size. It is asserted that such inconsistent design may cause the following complexity issues for hardware implementations. Firstly, the range of valid intra directions that are supported by the blocks in the same size is different between the ISP mode and the non-ISP modes. Secondly, the neighboring reference samples that are used to do the intra prediction for the blocks in the same size are different between the ISP mode and the non-ISP mode. Furthermore, to support the valid intra directions defined by the current ISP, each sub-block may need to access more above or left neighboring reference samples than the blocks that are in the same size but not coded by the ISP mode.

Figure 11A:
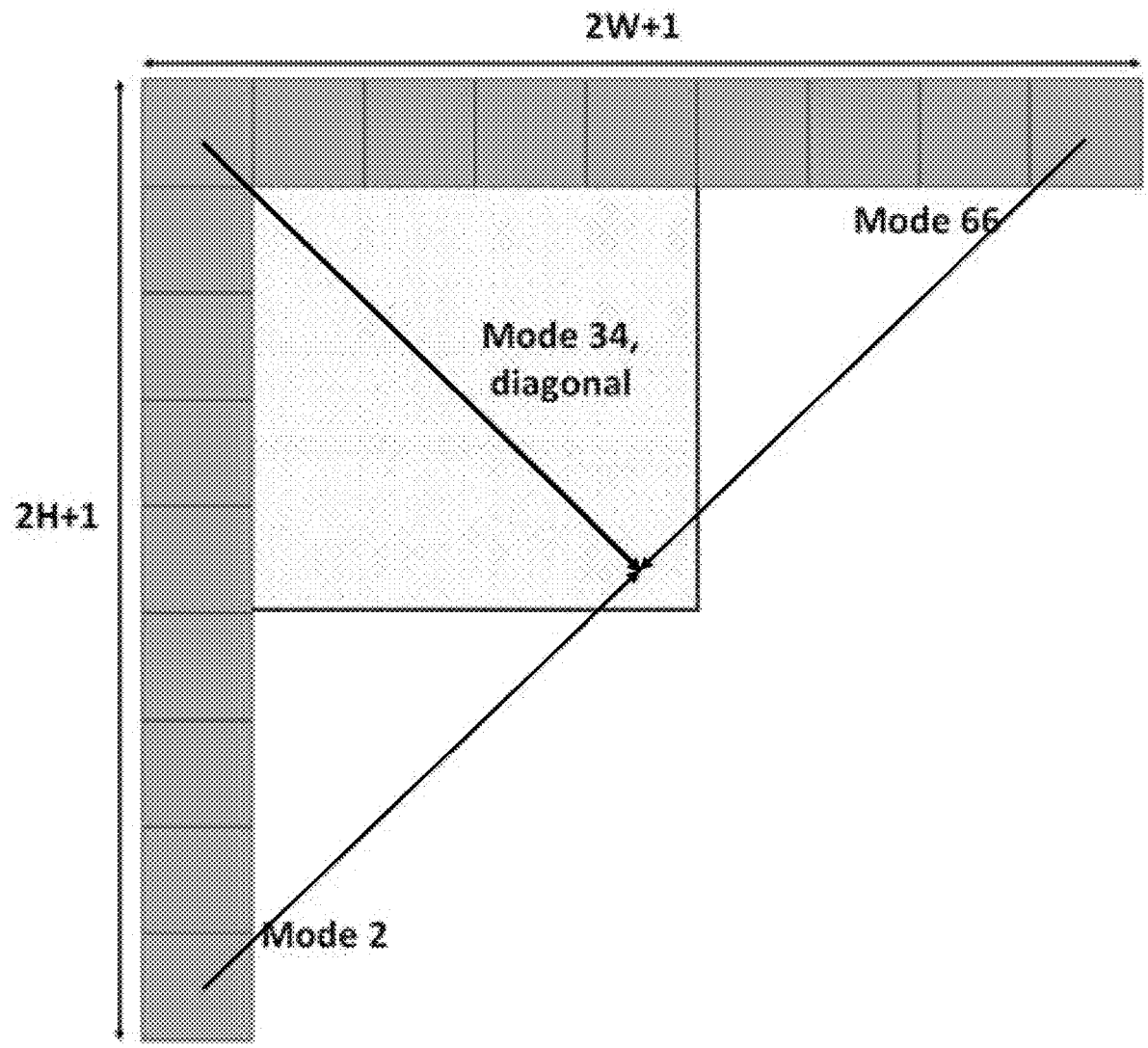
FIG. 11A is a diagram illustrating comparison of the range of valid intra directions and the used reference samples, according to an example of the present disclosure.
Figure 11B:
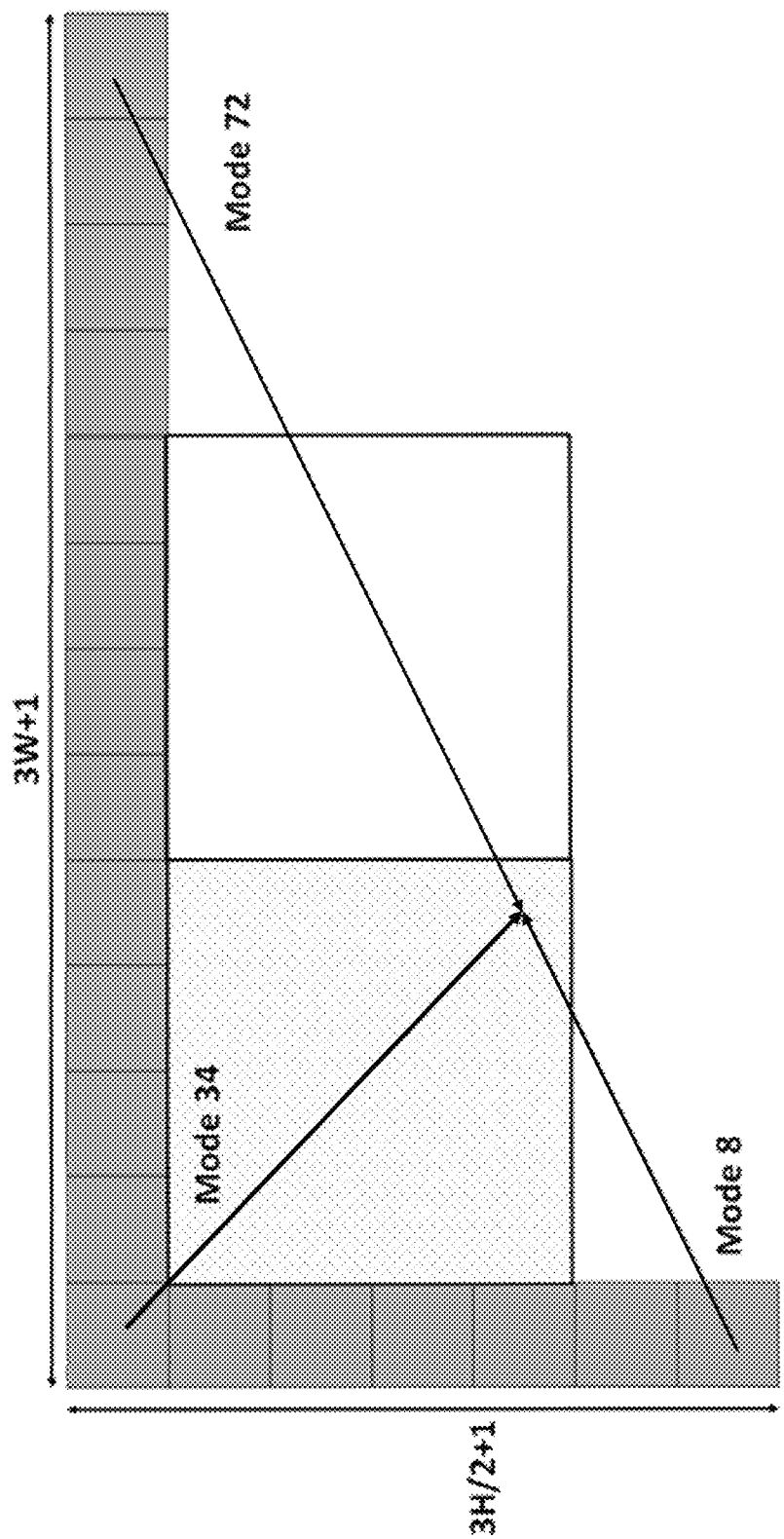
FIG. 11B is a diagram illustrating comparison of the range of valid intra directions and the used reference samples, according to an example of the present disclosure.

To illustrate the above two problems, let W and H be the width and height of one square block (i.e., W=H), FIG. 11A and FIG. 11B compares the range of valid intra directions and the used reference samples of the block between two cases when it is coded by normal intra modes and when it is coded as one sub-partition (assuming the vertical ISP partitioning is used to split the coding block into two sub-blocks) of the ISP mode. As shown in FIG. 11A, for normal intra modes, the supported angular intra directions range from mode 2 to mode 66 (i.e., covering the angles from 45 degree to −135 degree). To support those directions, the 2 W+1 above reference samples and the 2H+1 left reference samples are fetched to predict the samples inside the block. But when the block is coded by the ISP mode as in FIG. 11B, because the parent coding block is in flat rectangle shape, the wide-angle intra prediction is applied to the block such that the valid angular directions are from mode 8 to mode 72 (i.e., covering the angles from 63.4 degree to −116.6 degree). Correspondingly, 3 W+1 above reference samples and 3H/2+1 left reference sample need to be accessed. Note that compared to FIG. 11(a), W more reference samples need to be accessed in FIG. 11(b) from the above neighboring blocks.

Second, as discussed in the "introduction" section, due to the fact that there are strong correlations within the residuals of intra prediction, both DCT-II and DST-VII are applied for intra-predicted coding blocks when the MTS is disabled. However, as shown in Table 2 and Table 3, the coding blocks that are coded by normal intra modes and the ISP mode utilize different methods to select the optimal horizontal/vertical transform between DCT-II and DST-VII. Conceptually, the selection of optimal transforms is dependent on the actual distribution of prediction residuals, which should be highly correlated with the block size and the intra mode applied rather than the decision on whether the ISP is applied or not. On the other hand, one uniform design of transform selection for all intra coding blocks is more beneficial for efficient hardware implementations.

Third, as discussed in the "intra sub-partition coding mode" section, the MRL cannot be jointly applied with the ISP mode. This is done by always inferring the value of ISP flag to be zero when the MRL index of one intra block is non-zero. However, the gain of the MRL tool mainly come from the following two aspects: 1) because the quantization/de-quantization is applied in the transform domain, the reconstructed sample at different positions may have varying reconstruction quality such that the nearest neighbors may not always be the best references for intra prediction; 2) there may be coding noise and occlusions in the nearest neighbors that could lead to quality degradation of intra predicted samples. Based on such analysis, it seems unreasonable to disable the MRL for the ISP mode. In other words, an additional coding gain can be expected when enabling the combination of the ISP and the MRL.

FIG. 11A shows comparison of the range of valid intra directions and the used reference samples of one normal W×H block, in accordance with the present disclosure.

FIG. 11B shows comparison of the range of valid intra directions and the used reference samples of one W×H ISP sub-block, in accordance with the present disclosure.

Figure 12:
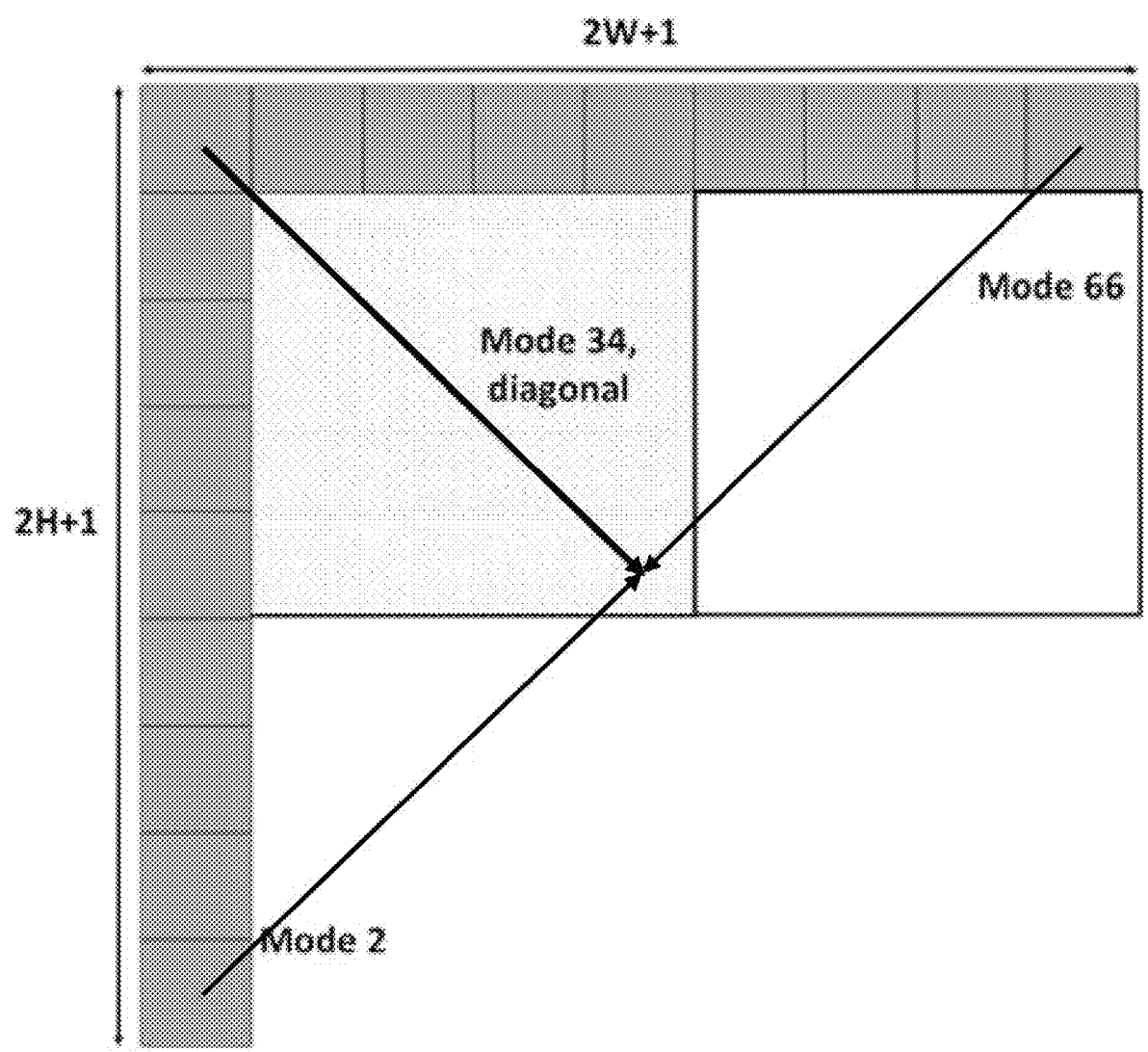
FIG. 12 is a diagram illustrating the valid intra modes and the reference samples used for the intra prediction of one ISP sub-block, according to an example of the present disclosure.

Enabling/Disabling the Wide-Angle Intra Directions for the ISP Based on Sub-Block Size According to the current VVC design, the wide-angle intra prediction can be applied to ISP coding blocks and the decision on whether the original intra mode or the corresponding wide-angle intra mode should be used for one sub-block is made based on the size of the whole coding block. As pointed out in the "problem statement" section, such design not only makes the range of supported intra directions inconsistent between the ISP blocks and the non-ISP blocks, but also may increase the number of reference samples needed from the above or left neighbors in order to predict the samples inside one block. To achieve a better design, instead of using the size of the whole coding block, it is proposed in one embodiment of the disclosure to enable/disable the wide-angle intra mode for the intra prediction of the coding block based on the size of its ISP sub-partitions. Using the same example in FIG. 11, FIG. 12 illustrates the range of valid intra directions and the used reference samples of each ISP sub-partition when the proposed method is applied. As can be seen from FIG. 12, after the proposed method is applied, the range of the supported intra mode of each sub-block is from mode 2 to mode 66 (i.e., from 45 degree to −135 degree) and the corresponding reference samples that are needed for the intra prediction include 2 W+1 reference samples from the above neighbors and 2H+1 reference samples from the left neighbors. All of those statistics are kept the same as that for one normal intra block in the same size (i.e., W×H) in FIG. 11(a). Thus, the proposed method can provide one harmonized design for the wide-angle intra prediction of the intra blocks, regardless of whether the intra blocks are coded with or without the ISP mode.

Additionally, in the current VTM-3.0, the maximum intra coding block width or height is 64 and the minimum intra coding block width or height is 4. Correspondingly, the 2aspect ratio of one intra block can be either M:1 or 1:M where M can be 1, 2, 4, 8, and 16. However, after the ISP is enabled, the width or height of one sub-partition can be down to 2 samples, and aspect ratios of 1:32 and/or 32:1 also become possible. Therefore, when enabling/disabling the wide-angle intra prediction for the ISP based on sub-block size, one pair of aspect ratios, i.e., 32:1 and 1:32, should be introduced when defining the supported wide-angle intra directions for the ISP. To implement this, one new element needs to be introduced into the angTable[ ] and invAngTable[ ], which define the tan and atan values of various intra angles as depicted as in Table 4 where the greyed elements are the newly introduced wide-angle intra directions due to the ISP mode.

TABLE 4

Modified angTable[ ] and invAngTable[ ] for angular intra prediction

| angTable[ ] | 0 | 1 | 2 | 3 | 4 | 6 | 8 | 10 | 12 | 14 | 16 | 18 | 20 | 23 | 26 | 29 |
|---|---|---|---|---|---|---|---|---|---|---|---|---|---|---|---|---|
| invAngTable[ ] | 0 | 8192 | 4096 | 2731 | 2048 | 1365 | 1024 | 819 | 683 | 585 | 512 | 455 | 410 | 356 | 315 | 282 |
| angTable[ ] | 32 | 35 | 39 | 45 | 51 | 57 | 64 | 73 | 86 | 102 | 128 | 171 | 256 | 341 | 512 | 1024 |
| invAngTable[ ] | 256 | 234 | 210 | 182 | 160 | 144 | 128 | 112 | 96 | 80 | 64 | 48 | 32 | 24 | 16 | 8 |

According to another embodiment of the disclosure, instead of adding new elements in Table 4 to handle intra prediction of sub-blocks with the new aspect ratio of 1:32 and/or 32:1, SIP may be always disabled for such cases. In other words, at decoder side, SIP mode is inferred as 0 (i.e. disabled) whenever the resulted sub-block has an aspect ratio of 32:1 and/or 1:32.

According to a third embodiment of the disclosure, instead of adding new elements in Table 4 to handle intra prediction of sub-blocks with the new aspect ratio of 1:32 and/or 32:1, the same set of intra prediction directions used for aspect ratio of 1:16 and 16:1 are used respectively for sub-blocks with aspect ratio of 1:32 and 32:1.

FIG. 12 shows the valid intra modes and the reference samples used for the intra prediction of one ISP sub-block when the wide-angle intra prediction is enabled/disabled based on the sub-block size, in accordance with the present disclosure.

Unified Transform Selection for Intra Coding Blocks

In the current VVC, when the MTS is disabled, different methods are applied to select the optimal horizontal/vertical transform from DCT-II and DST-VII for non-ISP coding blocks (as shown in Table 2) and ISP coding blocks (as shown in Table 3). As analyzed in the "problem statement" section, such design may not be reasonable, because the statistical distribution of intra prediction residuals for each block/sub-block should be independent on whether the ISP mode is applied to the current coding block or not. To achieve a more unified design, two methods are proposed in the following to harmonize the transform selection methods that are used for ISP coding blocks and non-ISP coding blocks.

In the first method, it is proposed to extend the application of the transform selection method of non-ISP coding blocks (as shown in Table 2) to ISP coding blocks. Specifically, by such method, the transform selection method of non-ISP coding blocks maintains the same as the existing design in Table 2 while the transform selection method of ISP coding blocks is modified as follows: when one ISP coding block is split into rectangular sub-partitions, the discrete sine transform VII (DST-VII)DST-VII is applied to the shorter dimension of each ISP sub-partition and the discrete cosine transform II (DCT-II) is applied to the longer dimension of the sub-partition; otherwise, when the ISP coding block is split into square sub-partitions, the DST-VII is applied to both horizontal and vertical directions. Additionally, to avoid the introduction of new transform sizes, the DST-VII is only applied when the corresponding dimension of the sub-partition is equal or smaller than 16 (the same constrained design in Table 2).

In the second method, it is proposed to extend the application of the transform selection method of ISP coding blocks (as shown in Table 3) to non-ISP blocks. In this method, the transform selection method of ISP sub-partitions is kept the same as the existing design in Table 3 and the transform selection of non-ISP coding blocks are modified to be based on the coding block size and the applied intra mode as specified in Table 3.

Harmonization of the MPM Generation Methods of ISP Coding Blocks and Non-ISP Coding Blocks As discussed in the "intra sub-partition coding mode" section, compared to non-ISP coding blocks, ISP mode utilizes one different method to form the MPM candidate list, which excludes DC mode and prioritizes either some adjacent horizontal intra modes or some adjacent vertical intra modes based on the partition direction that is applied. However, the corresponding coding benefits may be limited. For the purpose of unification, it is proposed in the current disclosure to use the same MPM list generation method that is used for non-ISP coding blocks to generate the MPM candidates of ISP blocks.

More Efficient MPM Generation Methods for ISP Coding Blocks

In case that the MPM generation for ISP coding blocks are kept different from that for non-ISP coding blocks, the current design of MPM generation for ISP coding blocks in VVC may be improved for better coding efficiency. According to the disclosure, when generating MPM for ISP coding blocks, when the current block is horizontally partitioned, intra prediction directions ranging from −14 to 18 (except direction 0 for planar and 1 for DC), as shown in FIG. 6, are excluded from selection. The motivation of such an exclusion is that these prediction directions are unlikely to provide prediction benefits for horizontally partitioned sub-blocks under ISP mode. Likewise, when generating MPM for ISP coding blocks and when the current block is vertically partitioned, intra prediction directions ranging from −50 to 80, as shown in FIG. 6, are excluded from selection.

According to the disclosure, when such an intra prediction direction is excluded from MPM selection for an ISP coding block based on the rules above, some other intra prediction direction may be added as a replacement. In one example, when its corresponding wide angle intra prediction direction exists, the wide angle intra prediction direction may be used as a replacement and put into the MPM list. In another example, some intra prediction direction neighboring to an intra mode that is already in the MPM list may be used as a replacement.

The Combination of the ISP with MRL

In the current VVC, the ISP mode and the MRL mode cannot be jointly applied to one intra coding block by enforcing the value ISP flag to be zero (i.e., disabled) when the used reference samples are not from the nearest neighborhood of the coding block (i.e., the MRL index is non-zero). As pointed out earlier, the ISP and the MRL improve intra coding efficiency from two different aspects. First, the ISP targets at the intra prediction efficiency by shortening the distance between the predicted samples and the reference samples. Second, the MRL targets at alleviating the negative impacts of coding noise and occlusions that exist in the nearest neighboring samples on the overall intra coding performance. Therefore, there is almost no overlap between the coding benefits that can be achieved by the ISP and the MRL. To further improve the efficiency of intra prediction, in this disclosure, it is proposed to enable the combination of the ISP mode and the MRL mode for one intra coding block.

In one embodiment, it is proposed to signal one ISP flag before or after the MRL index and the MRL index is shared by all the sub-partitions in the same ISP coding block, i.e., all the sub-partitions may use the i-th row/column of their respective reconstructed samples (as indicated by the MRL index) as reference to generate the intra predication samples.

In another embodiment, it is proposed to allow each sub-partition to make reference to different rows/columns of reconstructed neighboring samples. Specifically, in this method, the MRL index is signaled after the ISP flag. When the ISP flag is equal to zero (i.e., the coding block is not partitioned), one MRL index will be signaled, which is applied to determine the reference samples of the whole coding block; otherwise (the ISP flag is equal to one), depending on the number of sub-partitions in the coding block, multiple MRL indices will be signaled, one for each sub-partition, to separately indicate the location of the corresponding reference samples for deriving the intra prediction of each ISP sub-partition.

The Extended Reference Samples for ISP

Figure 13:
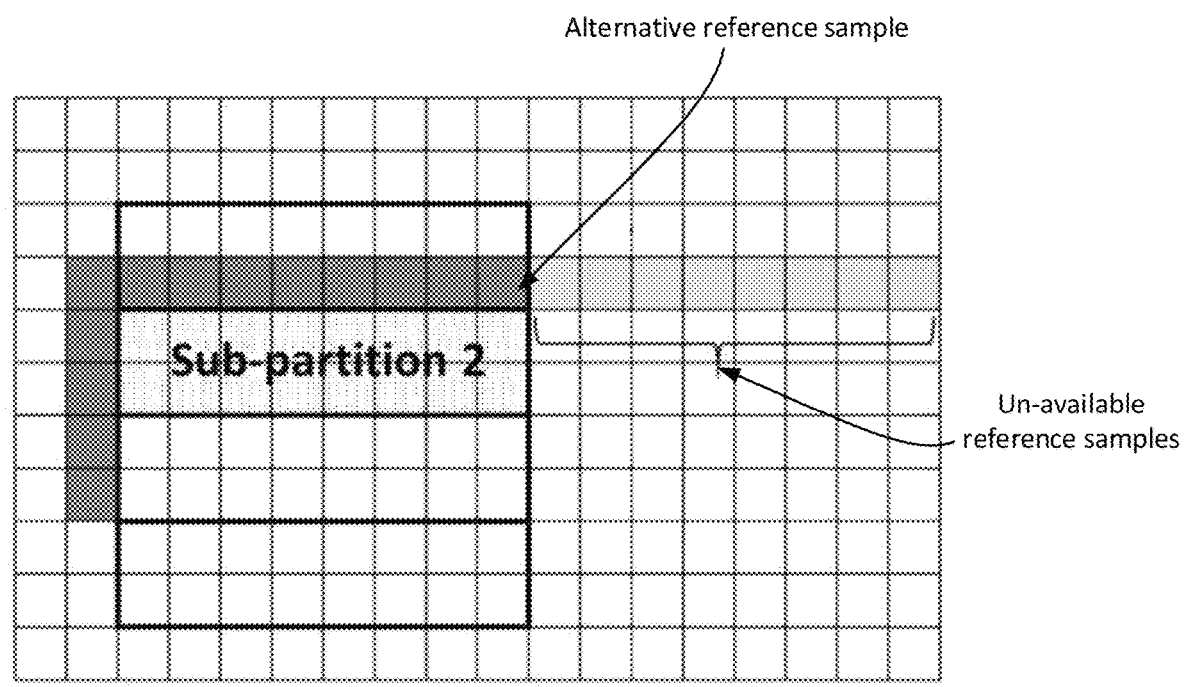
FIG. 13 is a diagram illustrating the un-available reference samples of the non-first sub-partition in horizontal partitioning, according to an example of the present disclosure.

As shown in FIG. 13, the reference samples for the non-first intra sub-partition may not be available. In current design of ISP, the closest available reference sample is used as an alternative for those unavailable reference samples. To improve the prediction efficiency of ISP, this disclosure uses different schemes to derive the alternative reference samples for those un-available reference samples.

Figure 14:
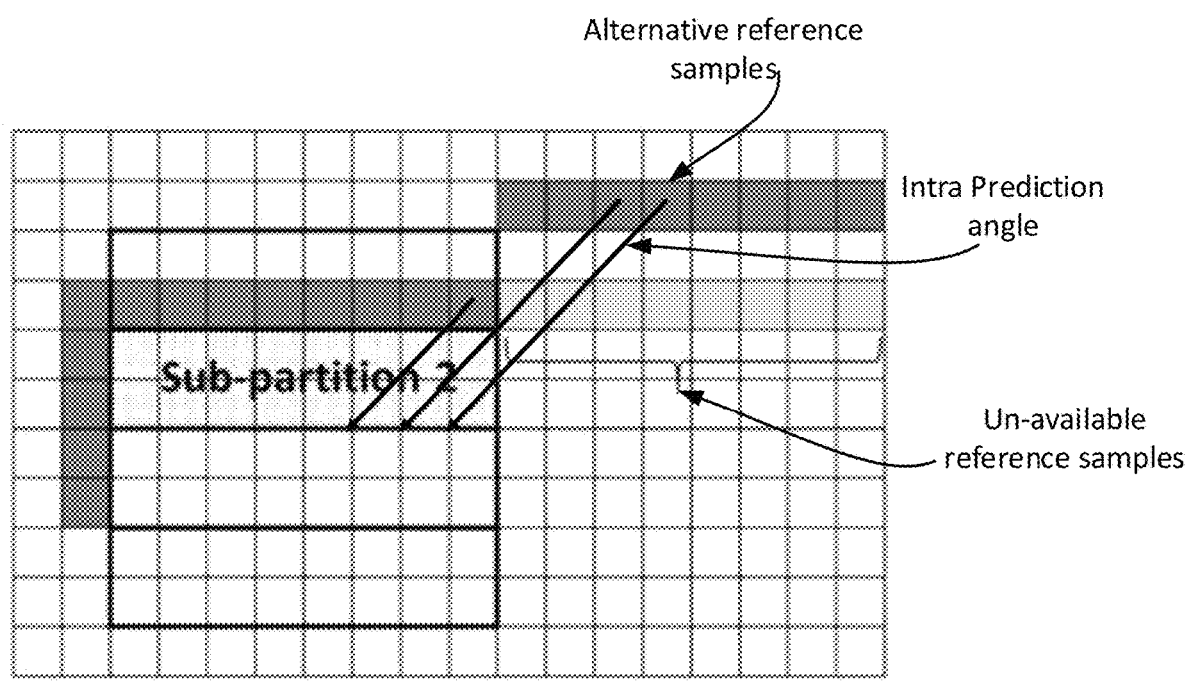
FIG. 14 is a diagram illustrating deriving the alternative reference samples for the un-available reference samples of the non-first sub-partition in horizontal partitioning, according to an example of the present disclosure.
Figure 15:
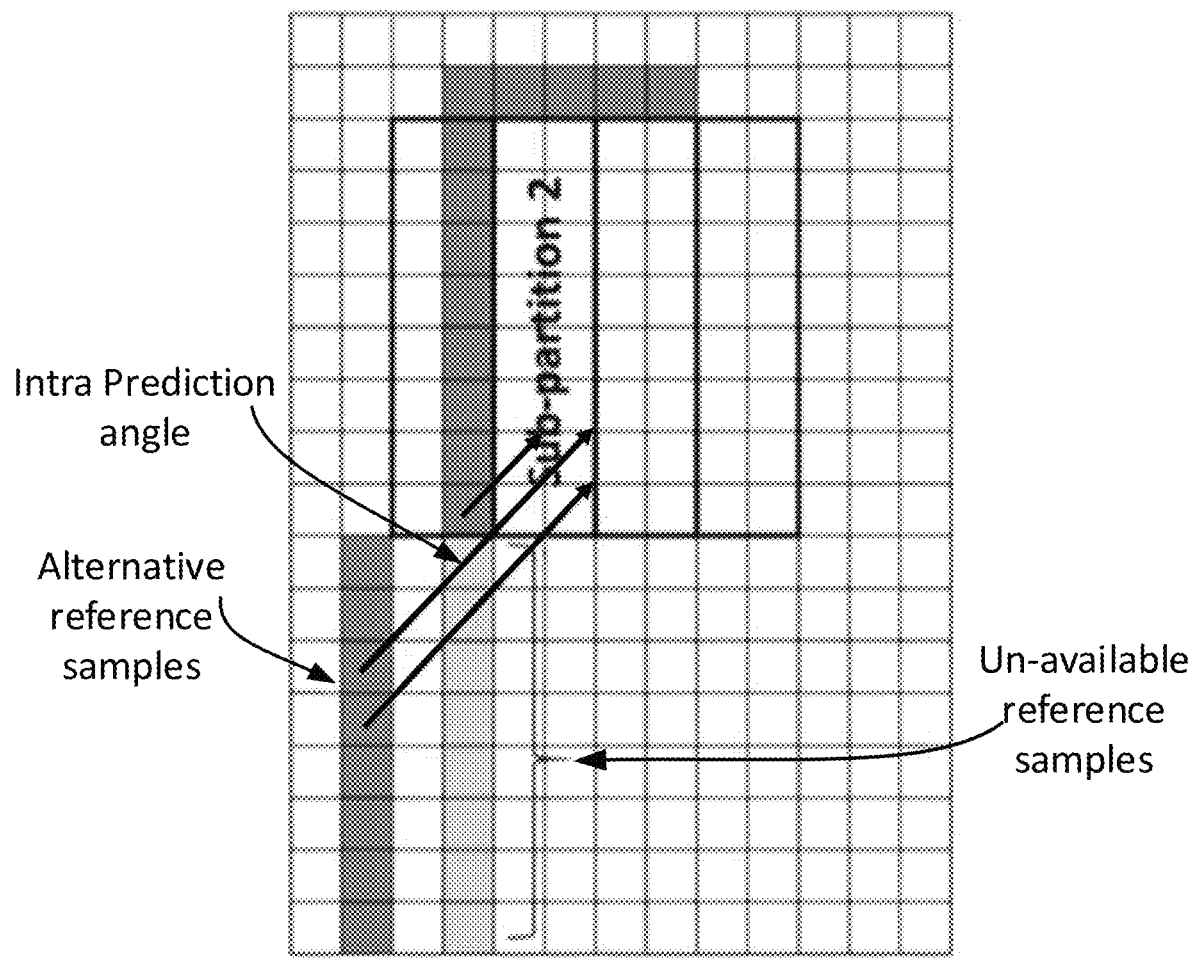
FIG. 15 is a diagram illustrating deriving the alternative reference samples for the un-available reference samples of the non-first sub-partition in vertical partitioning, according to an example of the present disclosure.

In one embodiment, the reference samples of the current coding block (or CU) are used as the alternative reference samples for those un-available reference samples. As shown in FIG. 14 and FIG. 15, for example, the alternative reference sample for each un-available reference sample is derived from the reference sample of current coding block (or CU) indicated by the angular intra prediction mode. When generating the alternative reference samples, the interpolation filter or reference sample smooth filter, which are used by the conventional intra prediction may also be applied here. Moreover, when the prediction mode is DC mode or Planar mode, no additional process is needed to derive the alternative reference samples.

Figure 16:
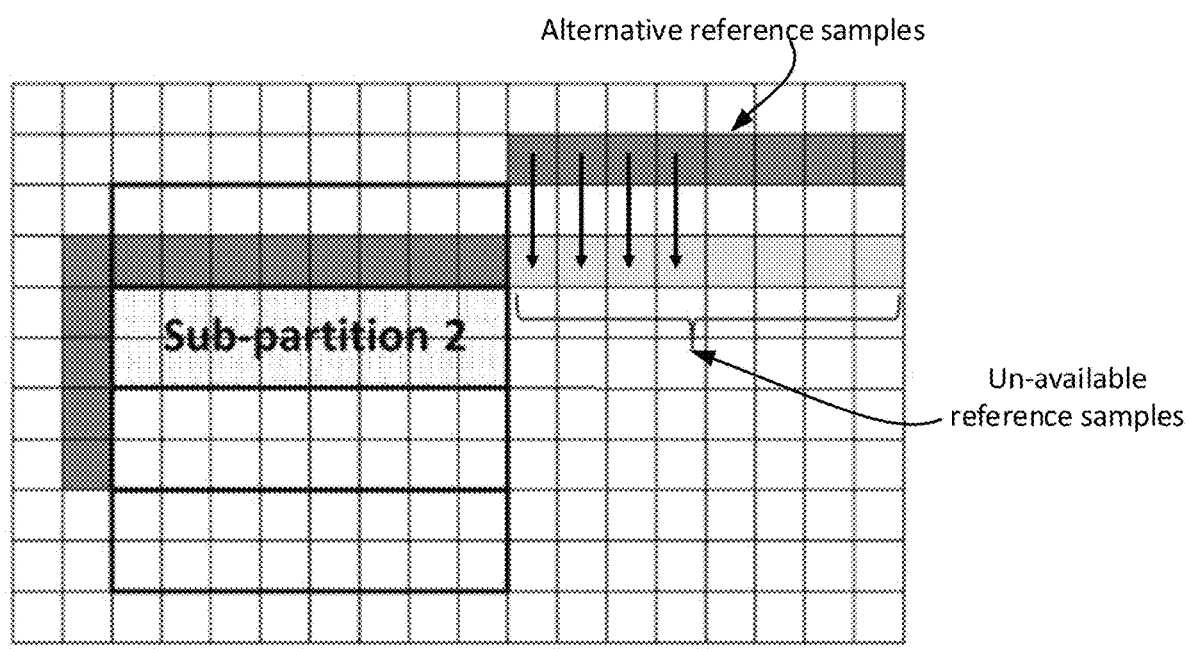
FIG. 16 is a diagram illustrating deriving the alternative reference samples for the un-available reference samples of the non-first sub-partition in horizontal partitioning, according to an example of the present disclosure.

In yet another embodiment, a simple copying is deployed to generate the alternative reference samples, as shown in FIG. 16.

The proposed ISP extended sample generation methods (as shown in FIG. 14, FIG. 15, and FIG. 16) may be freely combined with the other ISP improvement/simplification methods as proposed in the section. In one specific example, it is proposed to combine the ISP extended sample generation method with the ISP wide-angle intra directions in the "Enabling/disabling the wide-angle intra directions for the ISP based on sub-block size" section, i.e., determining whether to enable/disable the wide-angle intra directions based on the sub-partition size. When such combination is enabled, because the unavailable reference samples of non-first sub-partition is generated from the neighboring reference samples of the first sub-partition, more neighboring reference samples of the first sub-partition may be needed due to the fact that the number of alternative reference samples that are used by the non-first sub-partition is dependent on the corresponding wide-angle intra direction of the sub-partition that is derived according to the sub-block size rather than the coding block size. In other words, such design can potentially increase the number of accessed reference samples of the first sub-partition. In order to avoid such complexity increase, in one embodiment of the disclosure, it is proposed to generate those additional reference by padding out the value of the nearest reference sample in the original reference sample region of the sub-partition. In another embodiment, it is proposed to clip the intra mode of one non-first sub-partition to the closest intra mode that does not need to use additional reference samples beyond that of the first sub-partition.

FIG. 13 shows the un-available reference samples of the non-first sub-partition in horizontal partitioning; the same situation occurs in the non-first sub-partition in vertical partitioning, in accordance to the present disclosure.

FIG. 14 shows an illustration of deriving the alternative reference samples for the un-available reference samples of the non-first sub-partition in horizontal partitioning; the alternative reference samples are derived from the reference samples of the current coding block according to the intra prediction modes, in accordance to the present disclosure.

FIG. 15 shows an illustration of deriving the alternative reference samples for the un-available reference samples of the non-first sub-partition in vertical partitioning; the alternative reference samples are derived from the reference samples of the current coding block according to the intra prediction modes, in accordance to the present disclosure.

FIG. 16 shows an illustration of deriving the alternative reference samples for the un-available reference samples of the non-first sub-partition in horizontal partitioning; the alternative reference samples are directly copied from the reference samples of the current coding block; the same method applies in the non-first sub-partition in vertical partitioning, in accordance to the present disclosure.

Figure 17:
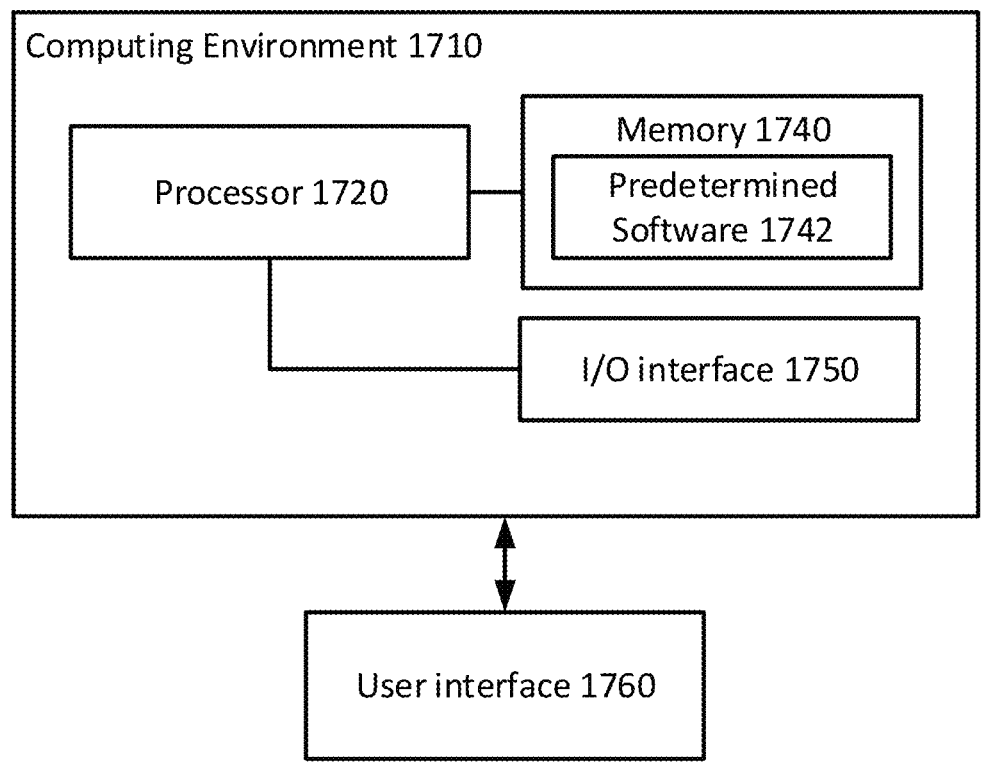
FIG. 17 is a diagram illustrating a computing environment coupled with a user interface, according to an example of the present disclosure.

FIG. 17 shows a computing environment 1710 coupled with a user interface 1760. Computing environment 1710 can be part of data processing server. Computing environment 1710 includes processor 1720, memory 1740, and I/O interface 1750.

The processor 1720 typically controls overall operations of the computing environment 1710, such as the operations associated with the display, data acquisition, data communications, and image processing. The processor 1720 may include one or more processors to execute instructions to perform all or some of the steps in the above-described methods. Moreover, the processor 1720 may include one or more modules that facilitate the interaction between the processor 1720 and other components. The processor may be a Central Processing Unit (CPU), a microprocessor, a single chip machine, a GPU, or the like.

The memory 1740 is configured to store various types of data to support the operation of the computing environment 1710. Examples of such data comprise instructions for any applications or methods operated on the computing environment 1710, video datasets, image data, etc. The memory 1740 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1750 provides an interface between the processor 1720 and peripheral interface modules, such as a keyboard, a click wheel, buttons, and the like. The buttons may include but are not limited to, a home button, a start scan button, and a stop scan button. The I/O interface 1750 can be coupled with an encoder and decoder.

In an embodiment, there is also provided a non-transitory computer-readable storage medium comprising a plurality of programs, such as comprised in the memory 1740, executable by the processor 1720 in the computing environment 1710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, wherein the plurality of programs, when executed by the one or more processors, cause the computing device to perform the above-described method for motion prediction.

In an embodiment, the computing environment 1710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

What is claimed is:

1. An intra sub-partition (ISP) method of encoding a video signal, the method comprising:
   partitioning a block of video data into a plurality of sub-partitions, wherein each sub-partition comprises NM samples, where N and M are number of samples in horizontal or vertical direction;
   obtaining a number of most probable intra predictions based on intra prediction modes of neighboring blocks of a current block and determining an intra prediction mode to predict the samples of the block sub-partitions;
   selecting an optimal transform combination from discrete cosine transform II (DCT-II), discrete sine transform VII (DST-VII), and discrete cosine transform VIII (DCT-VIII) transform kernels for each sub-partition, wherein selecting the optimal transform combination comprises applying a multiple transform selection (MTS) mode to the ISP;
   obtaining residual coefficients of a first sub-partition and deriving dequantized residual coefficients of the first sub-partition by performing inverse-quantization of the residual coefficients of the first sub-partition;
   deriving residual samples of the first sub-partition by performing inverse transforms on dequantized residual coefficients of the first sub-partition in horizontal and vertical directions, wherein the inverse transforms are based on the optimal transform combination of the first sub-partition;
   deriving prediction samples of the first sub-partition by performing intra prediction of the first sub-partition based on reconstructed samples adjacent to the first sub-partition;
   deriving the reconstructed samples of the first sub-partition by adding the residual samples of the first sub-partition to the prediction samples of the first sub-partition; and
   deriving prediction samples of a second sub-partition by performing intra prediction of the second sub-partition based on the reconstructed samples of the first sub-partition, wherein the optimal transform combination is indicated by one MTS flag and one MTS index, wherein the MTS flag corresponds to the block and is shared by sub-partitions and the MTS index corresponds to each sub-partition.

2. The method of claim 1, further comprising:
   selecting transform kernels from DCT-II and DST-VII based on a sub-partition size in response to determining that the MTS flag is zero; and
   selecting transform kernels from DST-VII and DCT-VIII that are applied in horizontal and vertical directions for one sub-partition and determining the value of the corresponding MTS index in response to determining that the MTS flag is not zero.

3. The method of claim 2, wherein selecting transform kernels from DCT-II and DST-VII based on the sub-partition size further comprises:
   in response to determining that the number of samples in one dimension of the sub-partition is equal or smaller than 16, applying the DST-VII transform in the dimension;
   in response to determining that the number of samples in one dimension is larger than 16, applying the DCT-II transform in the dimension.

4. A computing device comprising:
   one or more processors;
   a non-transitory computer-readable memory storing instructions executable by the one or more processors, wherein the one or more processors are configured to:
   partition a block of video data into a plurality of sub-partitions, wherein each sub-partition comprises NM samples where N and M are number of samples in horizontal or vertical direction;
   obtain a number of most probable intra predictions based on intra prediction modes of neighboring blocks of a current block and determining an intra prediction mode to predict the samples of the block sub-partitions;
   select an optimal transform combination from discrete cosine transform II (DCT-II), discrete sine transform VII (DST-VII), and discrete cosine transform VIII (DCT-VIII) transform kernels for each sub-partition, wherein selecting the optimal transform combination comprises applying a multiple transform selection (MTS) mode to an intra sub-partition (ISP) mode;
   obtain residual coefficients of a first sub-partition and deriving dequantized residual coefficients of the first sub-partition by performing inverse-quantization of the residual coefficients of the first sub-partition;
   derive residual samples of the first sub-partition by performing inverse transforms on dequantized residual coefficients of the first sub-partition in horizontal and vertical directions, wherein the inverse transforms are based on the optimal transform combination of the first sub-partition;

derive prediction samples of the first sub-partition by performing intra prediction of the first sub-partition based on reconstructed samples adjacent to the first sub-partition;

derive the reconstructed samples of the first sub-partition by adding the residual samples of the first sub-partition to the prediction samples of the first sub-partition; and derive prediction samples of a second sub-partition by performing intra prediction of the second sub-partition based on the reconstructed samples of the first sub-partition, wherein the optimal transform combination is indicated by one MTS flag and one MTS index, wherein the MTS flag corresponds to the block and is shared by sub-partitions and the MTS index corresponds to each sub-partition.

5. The computing device of claim 4, wherein the one or more processors are further configured to:

select transform kernels from DCT-II and DST-VII based on a sub-partition size in response to determining that the MTS flag is zero; and select transform kernels from DST-VII and DCT-VIII that are applied in horizontal and vertical directions for one sub-partition and determine the value of the corresponding MTS index in response to determining that the MTS flag is not zero.

6. The computing device of claim 5, wherein the one or more processors configured to select transform kernels from DCT-II and DST-VII based on the sub-partition size are further configured to:

in response to determining that the number of samples in one dimension of the sub-partition is equal or smaller than 16, apply the DST-VII transform in the dimension;

in response to determining that the number of samples in one dimension is larger than 16, apply the DCT-II transform in the dimension.

7. A non-transitory computer-readable storage medium storing a plurality of programs for execution by a computing device having one or more processors, wherein the plurality of programs, when executed by the one or more processors, cause the computing device to perform:

partitioning a block of video data into a plurality of sub-partitions, wherein each sub-partition comprises N×M samples where N and M are number of samples in horizontal or vertical direction;

obtaining a number of most probable intra predictions based on intra prediction modes of neighboring blocks of a current block and determining an intra prediction mode to predict the samples of the block sub-partitions;

selecting an optimal transform combination from discrete cosine transform II (DCT-II), discrete sine transform VII (DST-VII), and discrete cosine transform VIII (DCT-VIII) transform kernels for each sub-partition, wherein selecting the optimal transform combination comprises applying a multiple transform selection (MTS) mode to an intra sub-partition (ISP) mode;

obtaining residual coefficients of a first sub-partition and deriving dequantized residual coefficients of the first sub-partition by performing inverse-quantization of the residual coefficients of the first sub-partition;

deriving residual samples of the first sub-partition by performing inverse transforms on dequantized residual coefficients of the first sub-partition in horizontal and vertical directions, wherein the inverse transforms are based on the optimal transform combination of the first sub-partition;

deriving prediction samples of the first sub-partition by performing intra prediction of the first sub-partition based on reconstructed samples adjacent to the first sub-partition;

deriving the reconstructed samples of the first sub-partition by adding the residual samples of the first sub-partition to the prediction samples of the first sub-partition; and deriving prediction samples of a second sub-partition by performing intra prediction of the second sub-partition based on the reconstructed samples of the first sub-partition, wherein the optimal transform combination is indicated by one MTS flag and one MTS index, wherein the MTS flag corresponds to the block and is shared by sub-partitions and the MTS index corresponds to each sub-partition.

8. The non-transitory computer readable storage medium of claim 7, wherein the plurality of programs further cause the computing device to perform:

selecting transform kernels from DCT-II and DST-VII based on a sub-partition size in response to determining that the MTS flag is zero; and selecting transform kernels from DST-VII and DCT-VIII that are applied in horizontal and vertical directions for one sub-partition and determining the value of the corresponding MTS index in response to determining that the MTS flag is not zero.

9. The non-transitory computer readable storage medium of claim 8, wherein the plurality of programs caused the computing device to perform selecting transform kernels from DCT-II and DST-VII based on the sub-partition size further cause the computing device to perform:

in response to determining that the number of samples in one dimension of the sub-partition is equal or smaller than 16, applying the DST-VII transform in the dimension;

in response to determining that the number of samples in one dimension is larger than 16, applying the DCT-II transform in the dimension.

* * * * *